(12) United States Patent
Cohen et al.

(10) Patent No.: US 9,201,775 B1
(45) Date of Patent: *Dec. 1, 2015

(54) MANIPULATING A TEST SCENARIO TEMPLATE BASED ON DIVERGENT ROUTES FOUND IN TEST RUNS FROM DIFFERENT ORGANIZATIONS

(71) Applicant: Panaya Ltd., Raanana (IL)

(72) Inventors: Yossi Cohen, Raanana (IL); Mati Cohen, Raanana (IL); Nurit Dor, Raanana (IL); Dror Weiss, Raanana (IL)

(73) Assignee: Panaya Ltd., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/141,974

(22) Filed: Dec. 27, 2013

Related U.S. Application Data

(63) Continuation-in-part of application No. 13/103,078, filed on May 8, 2011, now Pat. No. 8,739,128.

(60) Provisional application No. 61/747,313, filed on Dec. 30, 2012, provisional application No. 61/814,305, filed on Apr. 21, 2013, provisional application No. 61/919,773, filed on Dec. 22, 2013.

(51) Int. Cl.
*G06F 11/36* (2006.01)
*G06F 9/445* (2006.01)

(52) U.S. Cl.
CPC ........ *G06F 11/3684* (2013.01); *G06F 9/44589* (2013.01); *G06F 11/36* (2013.01); *G06F 11/3604* (2013.01)

(58) Field of Classification Search
None
See application file for complete search history.

(56) References Cited

U.S. PATENT DOCUMENTS

| | | | |
|---|---|---|---|
| 5,629,878 | A | 5/1997 | Kobrosly |
| 6,360,332 | B1 | 3/2002 | Weinberg et al. |
| 6,810,494 | B2 | 10/2004 | Weinberg et al. |
| 6,865,692 | B2 | 3/2005 | Friedman et al. |
| 6,898,784 | B1 | 5/2005 | Kossatchev et al. |
| 7,032,212 | B2 | 4/2006 | Amir et al. |
| 7,581,212 | B2 | 8/2009 | West et al. |

(Continued)

OTHER PUBLICATIONS

Sreedevi Sampath, A Scalable Approach to User-session based Testing of Web Applications through Concept Analysis, 2004.

(Continued)

*Primary Examiner* — Isaac T Tecklu
(74) *Attorney, Agent, or Firm* — Active Knowledge Ltd.

(57) ABSTRACT

System, method, and non-transitory medium for utilizing divergent routes identified in runs of test scenarios to manipulate a test scenario template. A route may define a sequence of one or more elements involved in running a test scenario, such as test steps, transactions, or screens. A certain run of a test scenario, which is instantiated from a test scenario template and which defines a template route, is received. By accessing a database, other routes that diverge from the template route are identified. The divergent routes are used to manipulate the test scenario template, such as updating the test scenario template according to one or more of the divergent routes and/or generating a new test scenario template based on the test scenario template and one or more of the divergent routes.

20 Claims, 10 Drawing Sheets

(56) References Cited

U.S. PATENT DOCUMENTS

| | | | |
|---|---|---|---|
| 7,809,525 B2 | 10/2010 | Chagoly et al. | |
| 7,849,447 B1 | 12/2010 | Karis et al. | |
| 8,266,592 B2* | 9/2012 | Beto et al. | 717/124 |
| 2005/0081104 A1* | 4/2005 | Nikolik | 714/38 |
| 2008/0086348 A1 | 4/2008 | Rao et al. | |
| 2009/0019427 A1* | 1/2009 | Li et al. | 717/126 |
| 2009/0037885 A1* | 2/2009 | Edwards et al. | 717/128 |
| 2009/0106262 A1 | 4/2009 | Fallen et al. | |
| 2009/0183143 A1 | 7/2009 | Li et al. | |
| 2010/0192220 A1 | 7/2010 | Heizmann et al. | |
| 2010/0287534 A1* | 11/2010 | Vangala et al. | 717/124 |
| 2013/0014084 A1* | 1/2013 | Sahibzada et al. | 717/124 |

OTHER PUBLICATIONS

Jinhua Li, Clustering User Session Data for Web Applications Test, 2011, Journal of Computational Information Systems.

G. Ruffo, R. Schifanella, and M. Sereno, WALTy: A User Behavior Tailored Tool for Evaluating Web Application Performance, 2004, Proceedings of the Third IEEE International Symposium on Network Computing and Applications.

Sanaa Alsmadi, Generation of Test Cases From Websites User Sessions, 2011, The 5th International Conference on Information Technology.

David Leon, A Comparison of Coverage-Based and Distribution-Based Techniques for Filtering and Prioritizing Test Cases.

* cited by examiner

MANIPULATING A TEST SCENARIO TEMPLATE BASED ON DIVERGENT ROUTES FOUND IN TEST RUNS FROM DIFFERENT ORGANIZATIONS

CROSS-REFERENCE TO RELATED APPLICATIONS

This Application is a Continuation-In-Part of application Ser. No. 13/103,078, filed May 8, 2011. This Application claims the benefit of U.S. Provisional Patent Application No. 61/747,313, filed Dec. 30, 2012, and U.S. Provisional Patent Application No. 61/814,305, filed Apr. 21, 2013. This application also claims the benefit of U.S. Provisional Patent Application No. 61/919,773, filed Dec. 22, 2013, the entire contents of which is herein incorporated by reference in its entirety for all that it teaches without exclusion of any part thereof.

The following co-pending US Patent Applications, filed on Dec. 27, 2013: Ser. Nos. 14/141,514; 14/141,564; 14/141,588; 14/141,623; 14/141,655; 14/141,676; 14/141,726; 14/141,859; 14/141,887; 14/141,925, and the following co-pending US Patent Applications, filed on Dec. 28, 2013: Ser. Nos. 14/142,768; 14/142,769; 14/142,770; 14/142,771; 14/142,772; 14/142,774; 14/142,781; 14/142,783; 14/142,784, may include related subject matter.

BACKGROUND

Many organizations utilize complex software systems, such as Enterprise Resource Planning (ERP) systems, for conducting almost all aspects of their business. The software systems may involve many different software modules. Typically, each time a module is installed, updated, and/or customized, it should be tested in order to verify that it is operating as expected. Consequently, organizations often devote many resources for the purpose of testing and validating the performance of their software systems.

However, creating the needed tests is not a trivial task. It is not always simple to determine what elements need to be tested (e.g., which software modules, business processes, and/or transactions), or how to conduct the testing of those elements. For example, business processes may have different behaviors to cover different options, different users, and\or for special cases. Generating test that cover all cases in not trivial; it may require foresight, imagination, and experience that may not be available to the test designer. For example, the test designer may not be aware of certain options that are available in the system since they were never utilized by the organization to which the test designer belongs; however, a recent update to the system has caused these options to be applicable for the organization. In this case, the test designer may not anticipate, nor have knowledge of how to test, the new options.

Building an effective and relevant testing suite is usually a time-consuming process, built on trial and error and domain know-how. Until an effective testing suite is built, an organization may end up conducting inefficient and/or incomplete testing of its software systems. However, it is often the case that software systems belonging to different organizations utilize many software modules that are the same or similar, and/or software modules that involve similar customizations. Consequently, testers belonging to the different organizations often end up running tests for testing those same or similar components. Thus, were organizations able to utilize each other's testing-related knowledge, they would be able to expand their testing arsenal and come up with more effective, comprehensive, and relevant tests. For example, after an update to a certain software module, a certain organization may devise a few tests to verify the system's performance based on tests of other organizations, which may have identified and addressed certain aspects of the update which testers from the certain organization were unaware of. Thus, sharing of tests in this case may help organizations to generate relevant and effective tests more rapidly.

BRIEF SUMMARY

Some aspects of this disclosure involve methods, systems, and/or non-transitory computer-readable medium, which enable manipulation of a test scenario template in order to update it, or create a new template. The manipulation is done according to divergent routes that diverge from a template route defined by the test scenario template. Optionally, this may enable an organization to expand its tests by creating new templates from which to instantiate test scenarios. These additional templates may involve additional aspects not addressed by the original tests corresponding to the template routes.

In some embodiments, a test scenario template is a model according to which a test scenario may be structured. A test scenario template may include one or more test steps, which instruct a user on an action to be performed as part of the test, such as where to enter a value, what button to push, what screen to select, or what transaction to run. Optionally, a test scenario template may include one or more default values used for running an instantiation of the test scenario template (e.g., default values for certain fields in a screen).

In some embodiments, the divergent routes according to which the test scenario template is manipulated are obtained from runs of test scenarios run by users belonging to different organizations. Thus, the template manipulation may be considered a form of testing data sharing among the organizations.

One aspect of this disclosure involves a computer system that is configured to utilize divergent routes, identified in runs of test scenarios, to manipulate a test scenario template. The computer system includes a test identifier that is configured to identify runs of test scenarios run by users belonging to different organizations on software systems associated with the different organizations. Additionally, the computer system includes a route analyzer that is configured to receive a certain run of a test scenario run on a software system associated with a certain organization that does not belong to the different organizations. The certain run of a test scenario may be instantiated from a test scenario template and the test scenario template defines a template route that instantiations of the test scenario template are supposed to follow. The route analyzer is also configured to identify that the certain run follows a certain divergent route that diverges from the template route. The computer system includes a database that is configured to store the certain divergent route, and a route counter that is configured to count number of divergent routes in the database that are essentially the same as the certain divergent route. A template manipulator, which also belongs to the computer system, is configured to manipulate the test scenario template according to the divergent routes in the database that are essentially the same as the certain divergent route if the number of divergent routes reaches a predetermined threshold. Optionally, the template manipulator is configured to manipulate the test scenario template by generating a new test scenario template based on the test scenario template and one or more of the divergent routes. Additionally or alternatively, the template manipulator may be configured to manipulate the test scenario template by updating the test scenario template according to one or more of the divergent routes.

In one embodiment, the computer system optionally includes a data cleaner that is configured to select a value from the manipulated test scenario template, and remove the selected value from the manipulated test scenario template if the selected value does not appear in runs of test scenarios that follow at least two divergent routes in the database that are essentially the same as the certain divergent route. In another embodiment, the computer system optionally includes a monitoring module that is configured to monitor the users running the test scenarios on the software systems that belong to the different organizations and to provide data obtained from the monitoring to the test identifier. In yet another embodiment, the computer system optionally includes a user interface configured to suggest to a user to run an instantiation of the manipulated test scenario template.

One aspect of this disclosure involves a computer implemented method for utilizing divergent routes identified in runs of test scenarios to manipulate a test scenario template. Executing the method may involve performing the following: Identifying runs of test scenarios run by users belonging to the different organizations on software systems associated with the different organizations. Receiving a certain run of a test scenario run on a software system associated with a certain organization that does not belong to the different organizations. The certain run is instantiated from a test scenario template and the test scenario template defines a template route that instantiations of the test scenario template are supposed to follow. Identifying that the certain run follows a certain divergent route that diverges from the template route. Storing the certain divergent route in a database. Counting number of divergent routes in the database that are essentially the same as the certain divergent route, and if the number reaches a predetermined threshold, manipulating the test scenario template according to the divergent routes in the database that are essentially the same as the certain divergent route. Optionally, manipulating the test scenario template according to the divergent routes involves updating the test scenario template according to one or more of the divergent routes. Additionally or alternatively, manipulating the test scenario template according to the divergent routes may involve generating a new test scenario template based on the test scenario template and one or more of the divergent routes.

In one embodiment, executing the method may optionally involve monitoring the users running the test scenarios on the software systems that belong to different organizations and providing data obtained from the monitoring for use in the identifying of the runs of test scenarios. In another embodiment, executing the method may optionally involve selecting a value from the manipulated test scenario template, and removing the selected value from the manipulated test scenario template if the selected value does not appear in runs that follow at least two of the divergent routes. In yet another embodiment, executing the method may optionally involve suggesting to a user to run an instantiation of the manipulated test scenario template.

One aspect of this disclosure involves a non-transitory computer-readable medium for use in a computer to utilize divergent routes identified in runs of test scenarios to manipulate a test scenario template. The computer includes a processor, and the non-transitory computer-readable medium includes the following program code: Program code for identifying runs of test scenarios run by users belonging to the different organizations on software systems associated with the different organizations. Program code for receiving a certain run of a test scenario run on a software system associated with a certain organization that does not belong to the different organizations. The certain run is instantiated from a test scenario template and the test scenario template defines a template route that instantiations of the test scenario template are supposed to follow. Program code for identifying that the certain run follows a certain divergent route that diverges from the template route. Program code for storing the certain divergent route in a database. Program code for counting the number of divergent routes in the database that are essentially the same as the certain divergent route. And program code for manipulating the test scenario template according to the divergent routes in the database that are essentially the same as the certain divergent route if the number reaches a predetermined threshold.

In one embodiment, the program code for manipulating the test scenario template according to the divergent routes includes program code for updating the test scenario template according to one or more of the divergent routes. In another embodiment, the program code for manipulating the test scenario template according to the divergent routes include program code for generating a new test scenario template based on the test scenario template and one or more of the divergent routes. In yet another embodiment, the program code stored in the non-transitory computer-readable medium optionally includes program code for selecting a value from the manipulated test scenario template, and removing the selected value from the manipulated test scenario template if the selected value does not appear in runs that follow at least two of the divergent routes. Optionally, the program code also involves testing that the at least two of the divergent routes are associated with at least two different organizations.

BRIEF DESCRIPTION OF THE DRAWINGS

The embodiments are herein described, by way of example only, with reference to the accompanying drawings. In the drawings.

DETAILED DESCRIPTION

Figure 1:
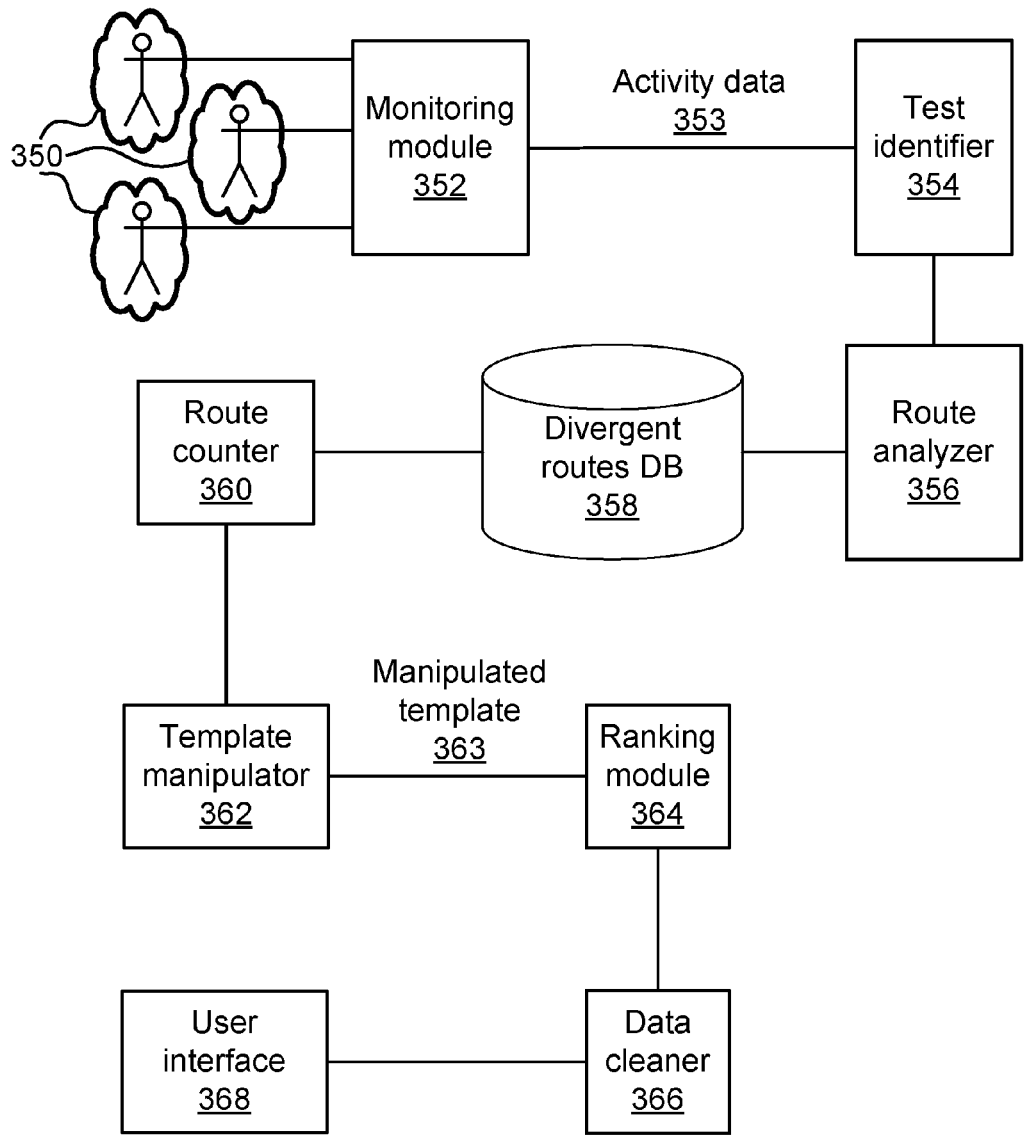
FIG. 1 illustrates one embodiment of a computer system configured to utilize runs of test scenarios run by users belonging to different organizations to manipulate a test scenario template according to divergent routes in the runs.

The term "transaction" is defined as a computer program, such as SAP ERP transaction or Oracle Application Form. In one example, a transaction may enable a user to access a certain functionality and/or may be called by filling its code in a box in a screen and/or by selecting it from a menu. In another example, a transaction is a logical portion of work, performed by a processor, involving the execution of one or more SQL statements.

The term "test step" refers to one or more actions performed via a User Interface (UI) as part of running a test scenario. In some cases, performing actions via a user interface may be achieved by interacting with the user interface, and/or by interacting with an Application Program Interface (API) related to the user interface.

The terms "a description of a run of a test scenario", also referred to as "a run of a test scenario", refer to data pertaining to running a test scenario on a software system (e.g., inputs, outputs, and/or intermediate data generated prior to running the test scenario, data generated during its run, and/or data generated as a result of running the test scenario). In one example, a run of test scenario may be obtained from monitoring a user running the test scenario on a software system. In the interest of brevity, in this disclosure, a term like "run of a test scenario" may be replaced with the shorter "run", where it is clear from the context. A run of a test scenario may be referred to as being "run by a user". This means that data included in the run of the test scenario is related to, or generated from, activity of the user on a software system, in which test steps of the test scenario were executed. Optionally, at least some of the data included in the run of the test scenario is derived from monitoring the activity of the user, which is related to execution of the test steps. Additionally, a run of a test scenario may be referred to as being associated with an organization, meaning that the run of the test scenario was run by a user belonging to the organization. Optionally, the user belonging to the organization ran the test scenario, at least in part, on a software system that belongs to the organization. Moreover, if it is mentioned, for example, that runs of test scenarios are received or clustered, it is meant that the objects being received may be processed descriptions of the runs of test scenarios (e.g., describing various attributes of the runs of the test scenarios), and not necessarily the actual raw recorded data that was initially obtained from monitoring users running the test scenarios.

A run of a test scenario may be considered an instantiation of the test scenario. That is, a certain test scenario may be run several times. For example, a test scenario may be run by different users, run on different systems, and/or run by the same user on the same system at different times. Each time the test scenario is run, that may be considered an event of instantiating the test scenario, and each run of the test scenario may be considered an instantiation of the test scenario.

In some embodiments, runs of test scenarios are identified from data obtained from monitoring users. Optionally, monitoring users may involve detecting, recording, and/or analyzing information entered by the users to computer systems and/or information presented to the users by the computer systems. Additionally or alternatively, monitoring may involve logging programs that were executed by the users, values utilized by the programs, memory content of programs and/or network traffic related to activities taken by the users. Optionally, a run of a test scenario may include data obtained from monitoring that underwent processing, summarization and/or analysis. Thus, a run of a test scenario need not necessarily include all data obtained from monitoring the running of the test scenario, and/or include data obtained from the monitoring in the same form as it was originally collected in.

A run of a test scenario may include descriptions of various aspects of running the test scenario such as: (i) the identity and/or composition (e.g., field types and/or identifiers) of a user interface (UI) screens the user manipulated and/or was exposed to while running the test scenario; (ii) user interactions with a system (e.g., actions performed by the user) (iii) transactions executed; (iii) behavior of the system during the test scenario (e.g., content of network transmissions, procedure calls, requests made to components of the system); and/or (iv) representations of the state of the system at various stages before, during, and/or after the test scenario is run. Additionally, a run of a test scenario may include data extracted from the test scenario and/or template of which the run is an instantiation. For example, the run may include values taken from a script according to which the run is executed and/or default values that appeared in template of which the run is an instantiation. The run may even include portions, or the entire scope, of the test scenario and/or the template of which the run is an instantiation.

A test scenario that is run by a user may be characterized according to its degree of automation, depending on type of involvement required of the user. In cases where the user is required to enter most of the values (e.g., field values on a screen), the run of the test scenario may be considered to be a manual run. In other cases, where the system provides some of the values (e.g., automatically fills values in no more than 95% of the fields on a screen/transaction/business process), but the user is still required to provide other values (e.g. enter values to fields that remain without values in the screen/transaction/business process), the run of the test scenario may be considered to be a semiautomatic run. In cases where little to no user intervention is needed (e.g., the script for running a test includes more than 95% of the values to be entered to the UI for the test, and is read by the system), the run of the test scenario may be considered to be an automatic run.

The term "test scenario template" refers to a model according to which a test scenario may be structured. A test scenario template may include one or more test steps, which instruct a user on an action to perform as part of the test, such as where to enter a value, what button to push, what screen to select, or what transaction to run. Optionally, a test scenario template may include one or more default values used for running an instantiation of the test scenario template (e.g., default values for certain fields in a screen). Additionally or alternatively, a test scenario template may be missing one or more values that are required for running an instantiation of the test scenario template; in such a case, a user running the instantiation of a template may provide the one or more missing values. In the interest of brevity, in this disclosure, a term like "test scenario template" may be replaced with the shorter "template", where it is clear from the context.

A run of a test scenario based on a test scenario template may be considered an instantiation of the test scenario template. For example, different users may run test scenarios based on a certain template; each time one of the users runs a test scenario based on the certain template, the corresponding run of that test scenario is considered an instantiation of the certain template. Similarly, if a user runs multiple test scenarios based on a template, where each time a test scenario was run it was run on a same software system, each of the runs of the test scenarios is considered a separate instantiation of the certain template. Optionally, a test scenario template may be considered associated with an organization if a user belonging to the organization ran an instantiation of the template and/or is intended to run an instantiation of the template. Additionally or alternatively, a test scenario template may be considered associated with an organization if the template was generated based on one or more runs of test scenarios that are associated with the organization.

As used herein, the term "software system" refers to a computer system that has software components (e.g., software modules that include programs). A software system may involve hardware (e.g., servers with processors) on which the software may run. The hardware may be dedicated hardware for the software system (e.g., servers sitting at an organization to which the software systems belong). Additionally or alternatively, hardware involved in a software system may be allocated on demand (e.g., cloud-based servers that are utilized by the software system as needed by it).

Figure 2:
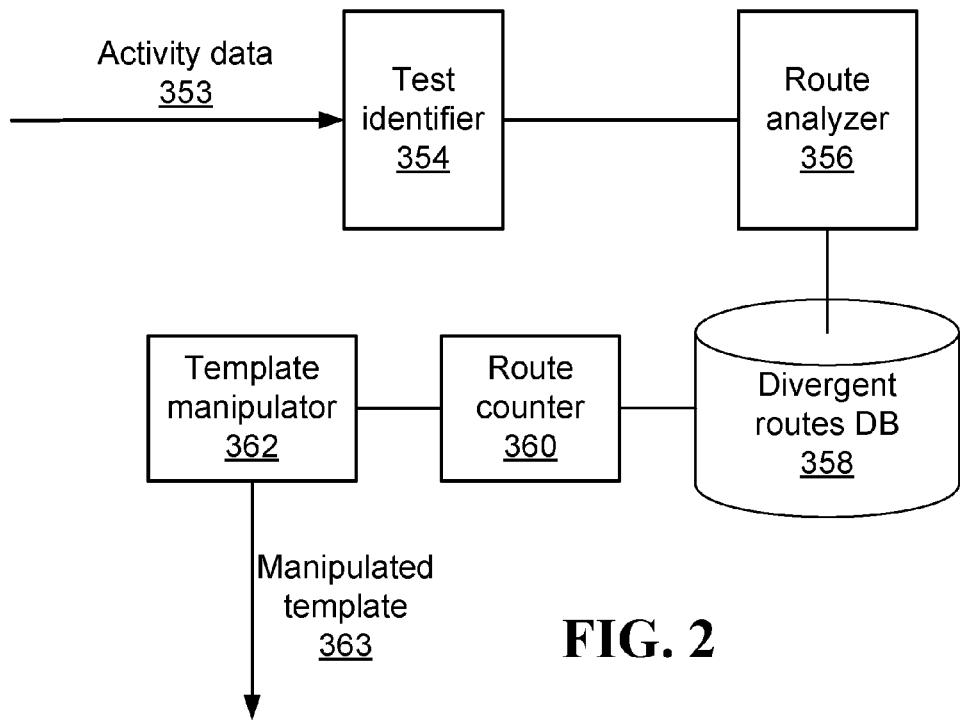
FIG. 2 illustrates one embodiment of a computer system configured to utilize runs of test scenarios run by users belonging to different organizations to manipulate a test scenario template according to divergent routes in the runs.

FIG. 1 and FIG. 2 illustrate embodiments of a computer system configured to utilize runs of test scenarios run by users belonging to different organizations to manipulate a test scenario template according to divergent routes in the runs. The illustrated embodiments include at least a test identifier 354, a route analyzer 356, a database 358, a route counter 360, and a template manipulator 362.

Herein, a route defines a sequence of one or more elements involved in a run of a test scenario; an element may be a test step, a transactions, or a screen. Additionally, a test scenario template may define a template route that instantiations of the template are supposed to follow. Thus, a run of a test scenario based on a template is expected to reflect the template route; for example, the run may describe screens and/or transactions included in the template route.

The test identifier 354 is configured to identify runs of test scenarios run by users belonging to different organizations on software systems associated with the different organizations. Optionally, the runs are identified based on activity data 353 obtained from monitoring the users.

In one embodiment, the route analyzer 356 is configured to receive a certain run of a test scenario instantiated from a test scenario template. Optionally, the route analyzer 356 may be configured to receive many runs of test scenarios; the description below describes examples of what may happen with the certain run. In one example, the certain run was run by a user after being suggested the template via a user interface. Optionally, the certain run of the test scenario was run on a software system associated with a certain organization that does not belong to the different organizations. Optionally, the different organizations and the certain organization are associated with different fields of operation (e.g., the different organizations are in the insurance field, while the certain organization is in the field of automobile manufacture). Alternatively, the different organizations and the certain organization are associated with a same field of operation.

The test scenario template defines a template route that instantiations of the template are supposed to follow. That is, each run of a test scenario instantiated from the template is supposed to reflect a certain sequence of elements, as defined by the template route. Optionally, a divergent route that diverges from a template route is characterized by a different sequence of elements compared to sequence of elements defined by the template route.

In one embodiment, based on the elements identified in the certain run, the route analyzer 356 characterizes a route followed by the certain run. The route analyzer 356 is also configured to identify that the certain run follows a certain divergent route that diverges from the template route. For example, the route analyzer 356 may compare elements in the template route with elements identified in the certain run in order to determine whether the elements are similar and/or appear in the same order as the elements in the template route.

In one embodiment, the route analyzer 356 is configured to identify divergent routes that diverge from the template route and later on converge back to the template route. Additionally or alternatively, the route analyzer 356 is also configured to identify divergent routes that diverge from the template route and do not converge back to the template route. Additionally or alternatively, the route analyzer is also configured to identify divergent routes that merge with the template route.

In one embodiment, if there is an essential difference between the certain route and the template route the template route it is considered a divergent route. For example, an essential difference may be a single element that differs between the certain route and the template route (e.g., a screen in the certain route that is not in the template route, a transaction in the template route that is not executed when following the certain route). Optionally, an essential difference involves at least a certain number of elements and/or a certain proportion of elements. For example, there may be an essential difference between the certain route and the template route if they differ on at least 5 elements and/or 15% of the elements.

In one embodiment, the database 358 is configured to store the certain divergent route identified by the route analyzer 356. Optionally, the database 358 may be configured to store many divergent routes; the examples listed below describe various possibilities for how the database 358 may handle the certain divergent route.

In one example, each time a divergent route is identified in a run of a test scenario, the divergent route is stored in the database 358. Optionally, storing a divergent route involves storing elements included in the divergent route, a run of a test scenario that follows the divergent route, information pertaining to a user that ran a test scenario that followed the divergent route, and/or information pertaining to an organization associated with a run of a test scenario that followed the divergent route.

In another example, each time a divergent route is identified in a run of a test scenario, the route analyzer 356 and/or the database 358 determine whether a route essentially the same as the divergent route has been already stored. If no essentially same divergent route has been stored, the divergent route is stored.

In one embodiment, routes that are essentially the same include the same sequence of screens. Optionally, routes that are essentially the same have a same sequence of screens but with different user keys. Optionally, routes that are essentially the same have a same sequence of screens but utilize different default values for at least some of the fields displayed on the screens.

Optionally, if an essentially same route has already been stored once, then a certain counter associated to the divergent route is incremented. Optionally, such a counter may be a counter corresponding to runs following the divergent route, a counter corresponding to users that ran runs following the divergent route, and/or a counter corresponding to organizations associated with runs following the divergent route.

In one embodiment, the route counter 360 is configured to count number of divergent routes stored in the database 358 that are essentially the same as the certain divergent route. Optionally, the route counter 360 queries and/or searches the database 358. Optionally, by processing results returned by the search and/or query the route counter 360 is able to return the number of number of divergent routes that are essentially the same as the certain divergent route. For example, the route counter 360 counts the number of divergent routes returned in the search and/or query. Optionally, the route counter 360 bases the number of divergent routes that are essentially the same as the certain divergent route on one or more values returned by counters associated to divergent routes. For example, given the certain divergent route, the route counter 360 returns a sum of counters associated with divergent routes that are essentially the same as the certain divergent route.

The template manipulator 362 is configured to manipulate the test scenario template according to the divergent routes in the database 358 that are essentially the same as the certain divergent route, generating a manipulated template 363. In one embodiment, the template manipulator 362 manipulates the template only if the number of divergent routes stored in the database 358 that are essentially the same as the certain divergent route reaches a predetermined threshold.

In one embodiment, the predetermined threshold is selected to have a certain value that signifies a likelihood of general usefulness of a certain divergent route; thus, the fact that the divergent routes essentially the same as the certain divergent route have a sufficiently large utilization (as indicated by reaching the predetermined threshold), indicates that the divergent routes are likely to be useful for other organizations too In one embodiment, the predetermined threshold may be a fixed value. For example, two divergent routes, i.e., two different runs of test scenarios need to have been identified as containing the essentially the same route as the certain divergent route in order for the predetermined threshold to be reached.

In another embodiment, the predetermined threshold may be proportional to various factors such as the number of the runs of the test scenarios, the number of users that ran the test scenarios, and/or the number of organizations associated with the runs of the test scenarios. In one example, the predetermined threshold increases with the number of different organizations, thus for instance, if there are 10 different organizations the predetermined threshold may be 3, but if there are 100 different organizations, the predetermined threshold may be 10.

In one embodiment, manipulating a test scenario template by the template manipulator 362 involves updating the template so the manipulated template 363 is different from the template prior to the updating. In one example, updating the test scenario template may involve adding one or more elements found in the divergent routes to the test scenario template. In another example, updating the test scenario template may involve removing one or more elements found in the test scenario template that are not found in the divergent routes. In yet another, updating the test scenario template may involve changing order of one or more elements found in the test scenario template, according to an order of elements found in the divergent routes.

In another embodiment, manipulating a test scenario template by the template manipulator 362 involves generating a new test scenario template based on the test scenario template and one or more of the divergent routes, which is considered the manipulated template 363. Thus, the manipulated template 363 may refer to an updated template or a newly generated template, depending on what manipulation the template manipulator 362 is configured to perform.

Figure 3:
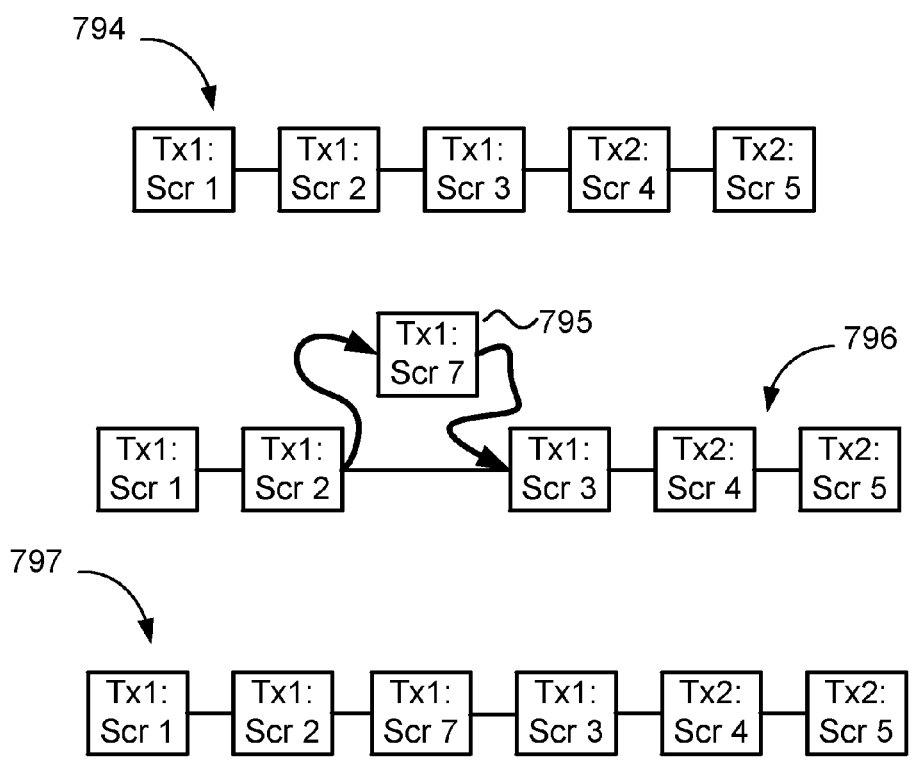
FIG. 3 illustrates updating of a test scenario template according to divergent routes.

In one example, the test scenario template 794 illustrated in FIG. 3 is updated according to divergent routes. In this example, template 794 involves two transactions (denoted "Tx1" and "Tx2" in FIG. 3) which include five screens (denoted "Scr 1" to "Scr 5" in FIG. 3). Based on runs of test scenarios by different users from different organizations, it may be determined that there is a route 796 that diverges from the route of the template 794. According to the divergent route, many users run an additional screen 795 belonging to Tx1 (the screen 795 denoted by "Scr 7" in FIG. 3). Therefore, the template 794 may be manipulated to create a manipulated template 797 which includes the screen 795 in the appropriate place. Optionally, the manipulated template 797 replaces the template 794. Alternatively, the manipulated template 797 may be created in addition to the template 794.

In one embodiment, the computer system optionally includes a data cleaner 366 configured to select a value from the manipulated test scenario template 363, and remove the selected value from the manipulated template 363 if the selected value does not appear in runs of test scenarios that follow at least two divergent routes that are essentially the same as the certain divergent route. Optionally, the data cleaner 366 is also configured to check that the at least two divergent routes are associated with at least two different organizations. For example, there is at least a first run of a test scenario that follows a first registered divergent route that is essentially the same as the certain divergent route; there is at least a second run of a test scenario that follow a first divergent route that is essentially the same as the certain divergent route that follows a second registered divergent route that is essentially the same as the certain divergent route; and a first organization is associated with the first run, and a second different organization, is associated with the second run.

In another embodiment, the computer system optionally includes a ranking module 364 configured to rank templates, such as, the manipulated test scenario template 363. Optionally, ranking the manipulated template 363 is done according to the number of its corresponding divergent routes. For example, the more divergent routes corresponding to a manipulated template 363, the higher the manipulated template 363 is ranked. In one example, ranking involves ordering templates according to number of their corresponding divergent routes. In another example, ranking involves assigning templates scores proportional to the number of their corresponding divergent routes. In still another example, ranking involves ordering templates according to number of different organizations corresponding to the divergent routes. The larger the number of organizations associated with runs that had divergent routes found to be essentially the same as a route corresponding to the manipulated template 363, the higher the rank of the manipulated template 363.

In one embodiment, the computer system optionally includes a monitoring module 352 that is configured to monitor the users 350 belonging to the different organizations and to the activity data 353 obtained from monitoring the users 350 to the test identifier 354.

In another embodiment, the computer system optionally includes a user interface 368 configured to suggest to a user to run an instantiation manipulated test scenario template. Optionally, the user interface 368 may initiate the instantiation of the manipulated test scenario template; for example, the user interface 368 may present a first screen belonging to the manipulated test scenario template and prompt a user to take a certain action to advance execution.

In one embodiment, the route analyzer 356 is configured to receive a run of a test scenario this is instantiated from a first test scenario template. The first test scenario template defines a first template route that instantiations of the first test scenario template are supposed to follow. The route analyzer 356 is also configured to determine whether the run follows a certain divergent route that diverges from the first template route. Optionally, if the it is determined that the run does follow the certain divergent route, the certain divergent route is stored in the database 358.

In one embodiment, the route counter 360 is configured to receive a second template route belonging to a second test scenario template. For example, there is a second run of a test scenario that is an instantiation of the second test scenario template; the second run follows a second template route defined by the second test scenario template. Optionally, the second test scenario template is associated with a certain organization that does not belong to the different organizations; for example, a user belonging to the certain organization ran the run of the second test scenario. Optionally, the route counter 360 is also configured to count number of divergent routes in the database 358 that are similar to second template route.

In one embodiment, the template manipulator 362 is configured to manipulate the second test scenario template according to the divergent routes in the database that are similar to the second template route. Optionally, the template manipulator 362 performs the manipulation if the number of divergent routes reaches a predetermined threshold. Optionally, the template manipulator 362 is also configured not to manipulate the second test scenario template according to the divergent routes if the number does not reach the predetermined threshold.

In one example, the software systems are screen based, and similar divergent routes start from, and end with, the same screens. In another example, the software systems are screen based, and similar divergent routes have the same chain of screens but with different user keys. In still another example, similar divergent routes have the same sequence of screens, but possibly utilize different default values for at least some fields displayed on the screens.

It is to be noted that different embodiments may implement components of the computer systems illustrated in FIG. 1 and/or FIG. 2 in different ways. For example, in some embodiments one or more of the following may be implemented by the same software module and/or software modules running on the same processor: the monitoring module 352, the test identifier 354, the route analyzer 356, the database 358, the route counter 360, the template manipulator 362, the ranking module 364, the data cleaner 366, and the user interface 368. Optionally, one or more of the aforementioned components may be implemented on a remote server, such as a cloud-based server.

In one example, the route analyzer 356 and/or the route counter 360 are implemented, at least in part, as part of the database 358. For example, they may involve software modules that belong to the database 358. In another example, the route analyzer 356 and the route counter 360 are implemented by the same software module that interacts with the database 358. In yet another example, the ranking module 364 is implemented as part of the template manipulator 362.

In one embodiment, the test identifier 354, the route analyzer 356, the database 358, the route counter 360, and/or the template manipulator are implemented as a cloud-based service that receives the activity data 353 of the users and manipulates templates to better suit the needs of the users. For example, the manipulated routes may test elements in a new and/or different way. Optionally, the ranking module 364 and/or the data cleaner 366 may also be part of the cloud-based service.

Figure 4:
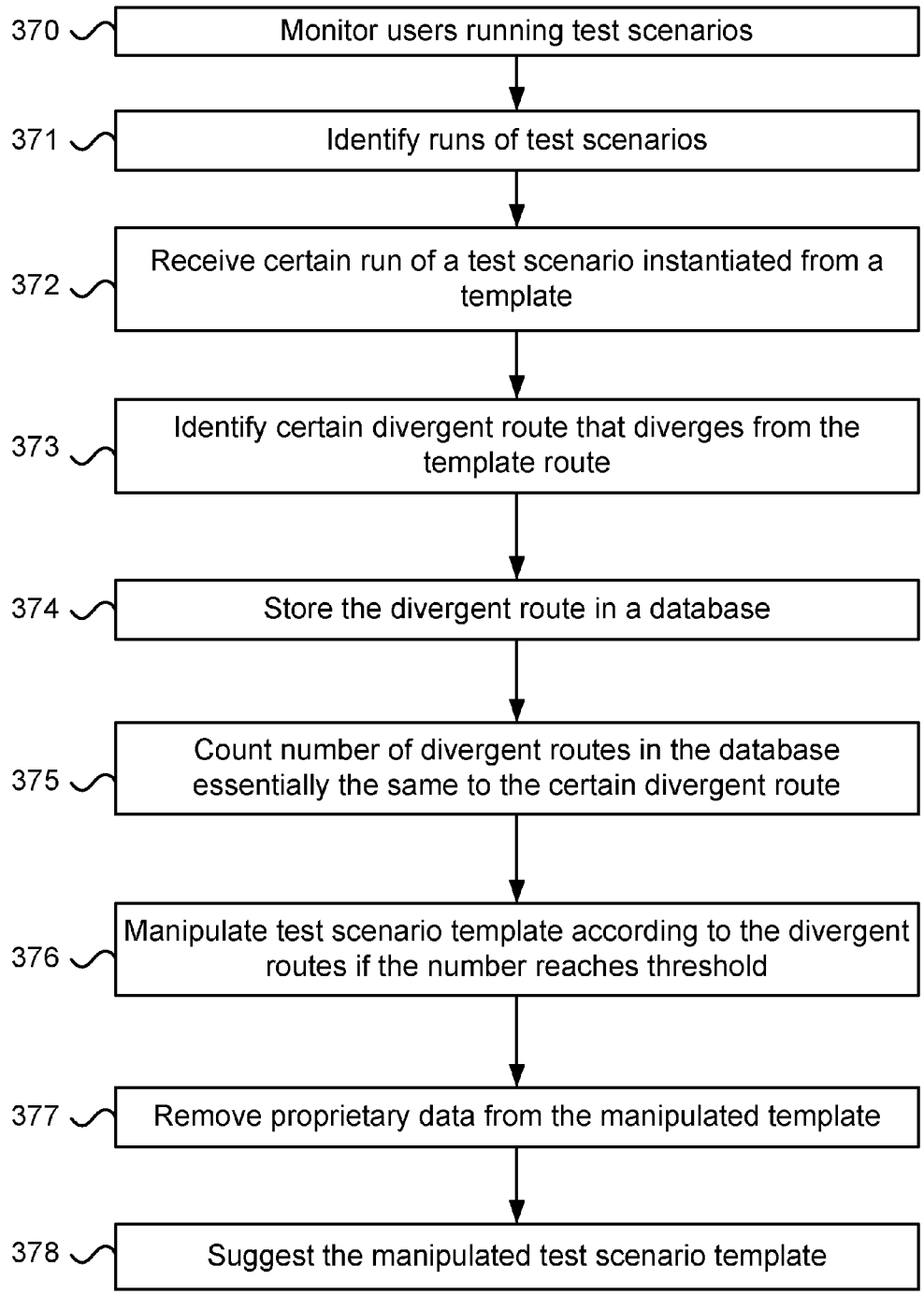
FIG. 4 illustrates one embodiment of a computer implemented method for utilizing divergent routes identified in runs of test scenarios to manipulate a test scenario template.

FIG. 4 illustrates one embodiment of a computer implemented method for utilizing divergent routes identified in runs of test scenarios to manipulate a test scenario template. The illustrated embodiment includes the following steps:

In step 371, identifying runs of test scenarios run by users belonging to the different organizations on software systems associated with the different organizations.

In step 372, receiving a certain run of a test scenario instantiated from a test scenario template; the certain run of the test scenario was run on a software system associated with a certain organization that is not one of the different organizations. Optionally, the different organizations and the certain organization are associated with different fields of operation. Alternatively, the different organizations and the certain organization are associated with a same field of operation.

Optionally, the test scenario template defines a template route that instantiations of the template are supposed to follow. Optionally, the template route includes a sequence of one or more elements involved in running an instantiation of the template. Optionally, an element may be a test step, a transaction, or a screen.

In step 373, identifying that the certain run follows a certain divergent route that diverges from the template route. Optionally, a divergent route is characterized by a different sequence of elements compared to sequence of elements defined by the template route.

In step 374, storing the certain divergent route in the database 358.

In step 375, counting number of divergent routes in the database 358 that are essentially the same as the certain divergent route.

And in step 377, if the number reaches a predetermined threshold, manipulating the test scenario template according to the divergent routes in the database that are essentially the same as the certain divergent route. Optionally, the predetermined threshold is selected such that reaching the predetermined threshold indicates that the essentially the same divergent routes are also likely to be useful for other organizations. Optionally, the predetermined threshold is at least two divergent routes.

Optionally, if the number does not reach the predetermined threshold, step 377 involves refraining from manipulating the test scenario template according to the divergent routes. Not reaching the predetermined threshold indicates that the divergent routes are not likely to be a suitable option for an organization associated with runs that follow the certain divergent route. Additionally, a number that does not reach the predetermined threshold may indicate that the divergent routes are too specific, and are likely useful primarily for the organizations that ran them.

In one embodiment, manipulating the test scenario template according to the divergent routes involves updating the test scenario template according to one or more of the divergent routes; for example, a new screen belonging to the divergent routes, which did not appear in the template, is added to the test scenario template.

In another embodiment, manipulating the test scenario template according to the divergent routes involves generating a new test scenario template based on the test scenario template and one or more of the divergent routes. For example, elements from the divergent routes are combined with elements in the existing test scenario template in order to generate a new template with a combination of elements that is not possessed by the test scenario template and possibly any of the divergent routes.

In one embodiment, identifying in the runs divergent routes in step 373 involves identifying divergent routes that diverge from the template route and later on converge back to the template route. Additionally or alternatively, identifying in the runs divergent routes in step 373 involves identifying divergent routes that diverge from the template route and do not converge back to the template route. Additionally or alternatively, identifying in the runs divergent routes in step 373 involves identifying divergent routes that merge with the template route.

In one embodiment, the computer implemented method includes an additional optional step 378 involving suggesting to a user to run an instantiation of the updated test scenario template. For example, the user interface 368 may utilized to present the updated template to the user.

In one embodiment, the computer implemented method includes an optional step 370, which involves monitoring the users and providing data obtained from the monitoring for use in the identifying of the runs of test scenarios.

In another embodiment, the computer implemented method includes an optional step 377 that involves selecting a value from the manipulated test scenario template, and removing the selected value from the manipulated test scenario template if the selected value does not appear in runs that follow at least two of the divergent routes. Optionally, step 377 also involves testing that the at least two of the divergent routes are associated with at least two different organizations.

In one embodiment, the computer implemented method illustrated in FIG. 4 includes an optional step of ranking the manipulated test scenario template according to the number of the divergent routes. Additionally or alternatively, ranking the manipulated test scenario template may be according to the number of different organizations associated with the divergent routes.

Figure 5:
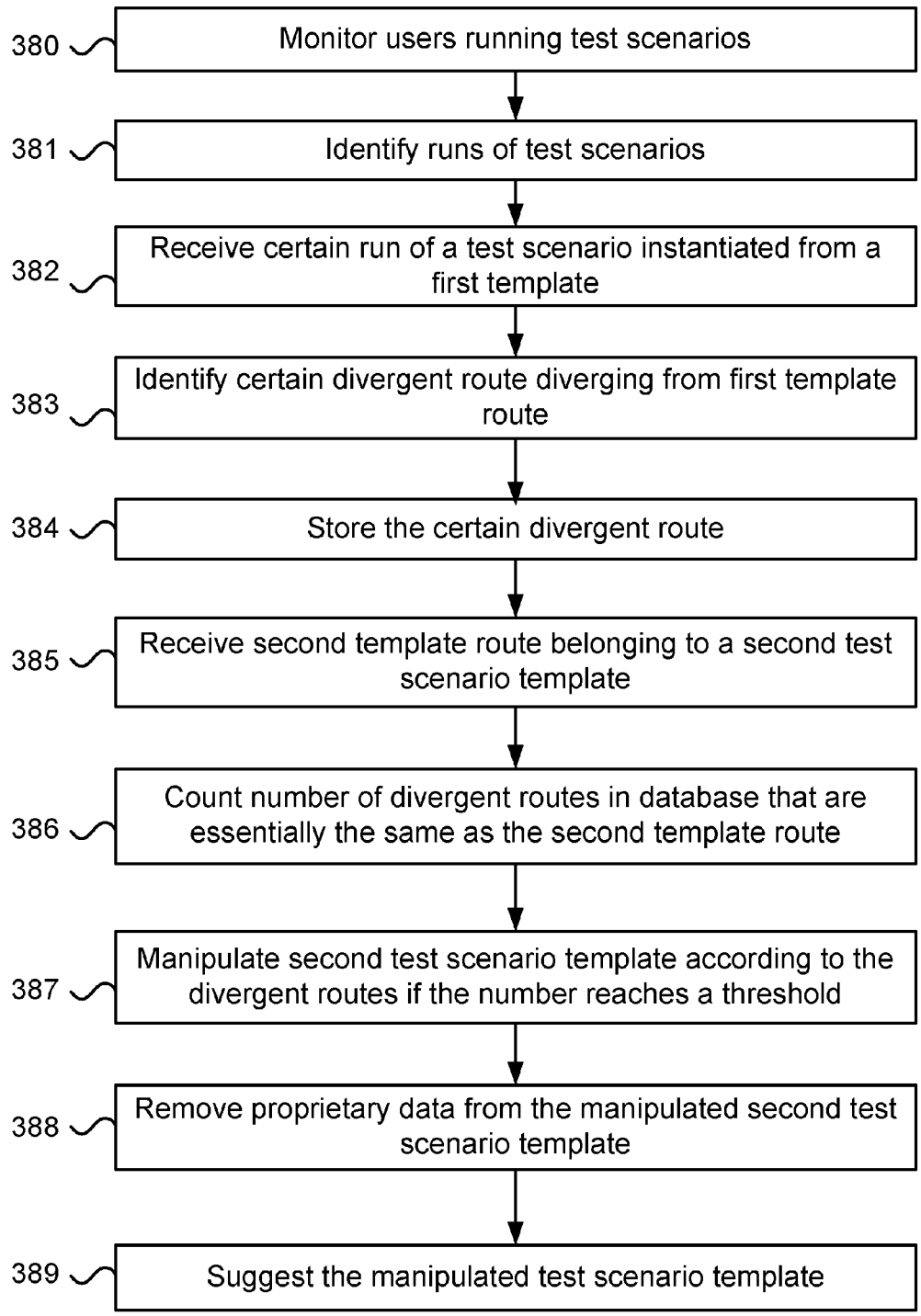
FIG. 5 illustrates one embodiment of a computer implemented method for utilizing divergent routes identified in runs of test scenarios to manipulate a test scenario template.

FIG. 5 illustrates another embodiment of a computer implemented method for utilizing divergent routes identified in runs of test scenarios to manipulate a test scenario template. The illustrated embodiment includes the following steps:

In step 381, identifying runs of test scenarios run by users belonging to the different organizations on software systems associated with the different organizations.

In step 382, receiving a certain run of a test scenario instantiated from a first test scenario template; the first test scenario template defines a first template route that instantiations of the first test scenario template are supposed to follow. Optionally, the first template route includes a sequence of one or more elements involved in running an instantiation of the first template. Optionally, an element may be a test step, a transaction, or a screen.

In step 383, identifying that the certain run follows a certain divergent route that diverges from the first template route. Optionally, a divergent route is characterized by a different sequence of elements compared to sequence of elements defined by the template route.

In step 384, storing the certain divergent route in the database 358.

In step 385, receiving a second template route belonging to a second test scenario template; the second test scenario template is associated with an organization that does not belong to the different organizations. Optionally, receiving the second template route involves receiving elements included in the second template route. Additionally or alternatively, receiving the second template route may involve receiving the second test scenario template that defines the second template route. Additionally or alternatively, receiving the second template route may involve receiving a run of a test scenario that follows the second template route, such as a run that is an instantiation of the second template route.

In step 386, counting number of divergent routes in the database 358 that are essentially the same as the second template route.

And in step 387, if the number reaches a predetermined threshold, manipulating the test scenario template according to the divergent routes in the database that are essentially the same as the second template route. Optionally, the predetermined threshold is selected such that reaching the predetermined threshold indicates that the essentially the divergent routes are also likely to be useful for other organizations. Optionally, the predetermined threshold is at least two divergent routes.

Optionally, if the number does not reach the predetermined threshold, step 387 involves refraining from manipulating the test scenario template according to the divergent routes. Not reaching the predetermined threshold indicates that the divergent routes are not likely to be a suitable option for an organization associated with runs that follow the certain divergent route. Additionally, a number that does not reach the predetermined threshold may indicate that the divergent routes are too specific, and are likely useful primarily for the organizations that ran them.

In one embodiment, identifying in the runs divergent routes in step 383 involves identifying divergent routes that diverge from the template route and later on converge back to the template route. Additionally or alternatively, identifying in the runs divergent routes in step 383 involves identifying divergent routes that diverge from the template route and do not converge back to the template route. Additionally or alternatively, identifying in the runs divergent routes in step 383 involves identifying divergent routes that merge with the template route.

In one embodiment, the computer implemented method includes an additional optional step 389 involving suggesting to a user to run an instantiation of the updated test scenario template. For example, a user interface may utilized to present the updated template to the user.

In one embodiment, the computer implemented method includes an optional step 380, which involves monitoring the users and providing data obtained from the monitoring for use in the identifying of the runs of test scenarios.

In another embodiment, the computer implemented method includes an optional step 388 that involves selecting a value from the manipulated test scenario template, and removing the selected value from the manipulated test scenario template if the selected value does not appear in runs that follow at least two of the divergent routes. Optionally, step 388 also involves testing that the at least two of the divergent routes are associated with at least two different organizations.

In one embodiment, the computer implemented method illustrated in FIG. 5 includes an optional step of ranking the manipulated test scenario template according to the number of the divergent routes. Additionally or alternatively, ranking the manipulated test scenario template may be according to the number of different organizations associated with the divergent routes.

In one embodiment, a non-transitory computer-readable medium stores program code that may be used by a computer to utilize divergent routes identified in runs of test scenarios to manipulate a test scenario template. The computer includes a processor, and the non-transitory computer-readable medium stores the following program code:

Program code for identifying runs of test scenarios run by users belonging to the different organizations on software systems associated with the different organizations.

Program code for receiving a certain run of a test scenario run on a software system associated with a certain organization that does not belong to the different organizations; the certain run is instantiated from a test scenario template and the test scenario template defines a template route that instantiations of the test scenario template are supposed to follow.

Program code for identifying that the certain run follows a certain divergent route that diverges from the template route.

Program code for storing the certain divergent route in a database.

Program code for counting number of divergent routes in the database that are essentially the same as the certain divergent route.

And program code for manipulating the test scenario template according to the divergent routes in the database that are essentially the same as the certain divergent route if the number reaches a predetermined threshold.

In one embodiment, the program code for manipulating the test scenario template according to the divergent routes includes program code for updating the test scenario template according to one or more of the divergent routes.

In another embodiment, the program code for manipulating the test scenario template according to the divergent routes include program code for generating a new test scenario template based on the test scenario template and one or more of the divergent routes.

In one embodiment, the program code stored in the non-transitory computer-readable medium optionally includes program code for refraining from manipulating the test scenario template according to the divergent routes if the number does not reach the predetermined threshold. Not reaching the predetermined threshold indicates that the divergent routes are not likely to be a suitable alternative to the second template route, for other organizations.

In one embodiment, the program code stored in the non-transitory computer-readable medium optionally includes program code for selecting a value from the manipulated test scenario template, and removing the selected value from the manipulated test scenario template if the selected value does not appear in runs that follow at least two of the divergent routes. Optionally, the program code also involves testing that the at least two of the divergent routes are associated with at least two different organizations.

In another embodiment, a non-transitory computer-readable medium stores program code that may be used by a computer to utilize divergent routes identified in runs of test scenarios to manipulate a test scenario template. The computer includes a processor, and the non-transitory computer-readable medium stores the following program code:

Program code for identifying runs of test scenarios run by users belonging to the different organizations on software systems associated with the different organizations.

Program code for receiving a certain run of a test scenario; the certain run is instantiated from a first test scenario template and the first test scenario template defines a first template route that instantiations of the first test scenario template are supposed to follow.

Program code for identifying that the certain run follows a certain divergent route that diverges from the first template route.

Program code for storing the certain divergent route in a database.

Program code for receiving a second template route belonging to a second test scenario template. The second test scenario template is associated with an organization that does not belong to the different organizations.

Program code for counting number of divergent routes in the database that are essentially the same as the second template route.

And program code for manipulating the second test scenario template according to the divergent routes in the database that are essentially the same as the second template route if the number reaches a predetermined threshold.

In one embodiment, the program code for manipulating the second test scenario template according to the divergent routes includes program code for updating the second test scenario template according to one or more of the divergent routes.

In another embodiment, the program code for manipulating the second test scenario template according to the divergent routes includes program code for generating a new test scenario template based on the second test scenario template and one or more of the divergent routes.

In one embodiment, the program code stored in the non-transitory computer-readable medium optionally includes program code for refraining from manipulating the second test scenario template according to the divergent routes if the number does not reach the predetermined threshold. Not reaching the predetermined threshold indicates that the divergent routes are not likely to be a suitable alternative to the second template route, for other organizations.

In one embodiment, the program code stored in the non-transitory computer-readable medium optionally includes program code for selecting a value from the manipulated second test scenario template, and removing the selected value from the manipulated second test scenario template if the selected value does not appear in runs that follow at least two of the divergent routes. Optionally, the program code also involves testing that the at least two of the divergent routes are associated with at least two different organizations.

Figure 6:
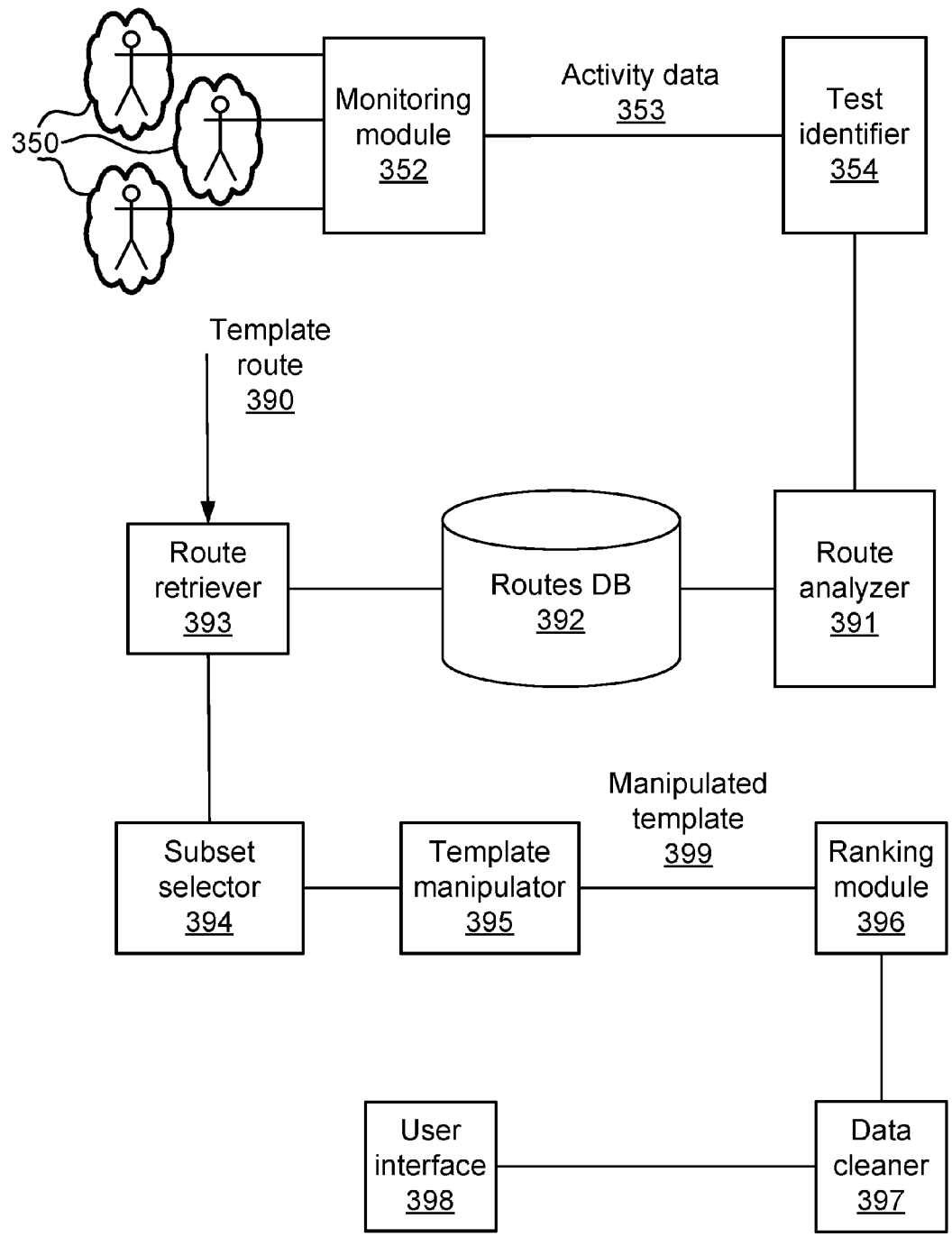
FIG. 6 illustrates one embodiment of a computer system configured to utilize routes followed by runs of test scenarios to manipulate a test scenario template.
Figure 7:
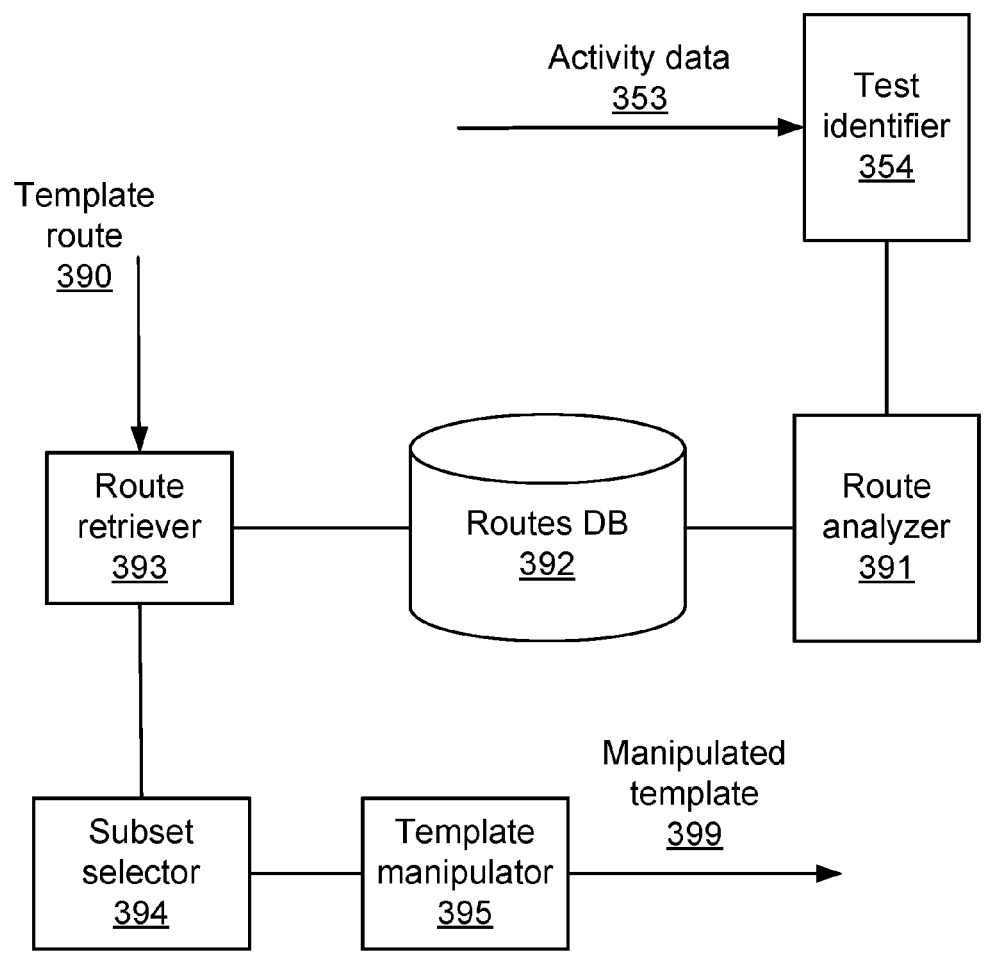
FIG. 7 illustrates one embodiment of a computer system configured to utilize routes followed by runs of test scenarios to manipulate a test scenario template.

FIG. 6 and FIG. 7 illustrate embodiments of a computer system configured to utilize routes followed by runs of test scenarios to manipulate a test scenario template. The illustrated embodiments include at least a test identifier 354, a route analyzer 391, a database 392, a route retriever 393, a subset selector 394, and a template manipulator 395.

Herein, a route defines a sequence of one or more elements involved in a run of a test scenario; an element may be a test step, a transactions, or a screen. Additionally, a test scenario template may define a template route that instantiations of the template are supposed to follow. Thus, a run of a test scenario based on a template is expected to reflect the template route; for example, the run may describe screens and/or transactions included in the template route.

The test identifier 354 is configured to identify runs of test scenarios run by users belonging to different organizations on software systems associated with the different organizations. Optionally, the runs are identified from activity data 353 obtained from monitoring the users.

In one embodiment, the route analyzer 391 is configured to receive a run of a test scenario and to identify a route that the run follows; the run may be one of the runs identified by the test identifier 354. Optionally, the route analyzer 391 identifies in the run certain elements that may include test steps executed while running the test scenario, transactions and/or businesses executed while running the test scenario, and/or screens presented to a user running the test scenario. The certain elements may also be used to describe the route. In this case, the run may be referred to as "following the route".

Optionally, the route analyzer 391 may identify multiple routes that the run follows. For example, the multiple routes may contain different types of elements; e.g., a first route may include screens, while a second route may include transactions. Thus, the run be referred to as following both routes. Additionally or alternatively, the route analyzer 391 may include in a route a subset of the elements identified in the run. For example, the route analyzer 391 may exclude certain screens from a route if those screens are utilized only by one organization and/or contain primarily proprietary data.

In one embodiment, the database 392 is configured to store the routes identified by the route analyzer 391. Optionally, at least some of the functionality of the route analyzer 391 is performed by the database 392; for example, part of the identification of routes is performed by software and/or hardware that is part of the database (e.g., running on a server belonging to the database 392), and/or is controlled by the database (e.g., a module of the database 392 may control some of the processes performed by the route analyzer 391).

In one example, each time a route is identified in a run of a test scenario, the route is stored in the database 392. Optionally, storing a route involves storing elements included in the route, a run of a test scenario that follows the route, information pertaining to a user that ran a test scenario that followed the route, and/or information pertaining to an organization associated with a run of a test scenario that followed the divergent route.

In another example, each time a route is identified in a run of a test scenario, the route analyzer 391 and/or the database 392 determine whether another route essentially the same as the route has been already stored. If no essentially same route has already been stored, the route is stored in the database 392.

Optionally, if another essentially same route has already been stored, then a certain counter associated to the already stored route is incremented. Optionally, such a counter may be a counter corresponding to runs following the stored route, a counter corresponding to users that ran runs following the stored route, and/or a counter corresponding to organizations associated with runs following the stored route.

The route retriever 393 is configured to receive a certain template route 390 belonging to a test scenario template and to retrieve from the database 392 divergent routes that diverge from the template route 390. The test scenario template defines the template route 190, which is a route that instantiations of the template are supposed to follow. That is, each run of a test scenario instantiated from the template is supposed to reflect a certain sequence of elements, as defined by the route. Optionally, the route retriever 393 receives the test scenario template to which the route 390 belongs, and derives the route 390 from the template. Additionally and or alternatively, the route retriever 393 may receive a representation of the template route 390.

In one embodiment, at least some of the functionality of the route retriever 393 is performed by the database 392; for example, part of the identification of divergent routes is performed by software and/or hardware that is part of the database (e.g., running on a server belonging to the database 392), and/or is controlled by the database (e.g., a module of the database 392 may control some of the processes performed by the route retriever 393).

In one embodiment, the test scenario template received by the route retriever 393 is associated with a certain organization that does not belong to the different organizations. Optionally, a test scenario template may be considered associated with an organization if a user belonging to the organization ran an instantiation of the template and/or is intended to run an instantiation of the template. Additionally or alternatively, a test scenario template may be considered associated with an organization if the template was generated based on one or more runs of test scenarios that are associated with the organization. Optionally, the different organizations and the certain organization are associated with different fields of operation (e.g., the different organizations are in the insurance field, while the certain organization is in the field of automobile manufacture). Alternatively, the different organizations and the certain organization are associated with a same field of operation.

Based on the elements included in the template route 390, the route retriever 393 may identify in the database 392 routes that diverge from the template route 390, and as such are considered divergent routes with respect to the template route 390. Optionally, a divergent route that diverges from a template route 390 is characterized by a different sequence of elements compared to sequence of elements defined by the template route 390. For example, the route retriever 393 may compare elements in the template route 390 with elements belonging to runs in the database 392 in order to determine whether some elements being compared are similar and/or appear in the same order as the elements in the template route 390.

In one embodiment, the route retriever 393 is configured to identify divergent routes that diverge from the template route 390 and later on converge back to the template route 390. Additionally or alternatively, the route retriever 393 may also be configured to identify divergent routes that diverge from the template route 390 and do not converge back to the template route 390. Additionally or alternatively, the route retriever 393 may be also configured to identify divergent routes that merge with the template route 390.

In one embodiment, an essentially exhaustive search is performed in the database to identify the divergent routes. Optionally, essentially all routes stored in the database 392 are evaluated and/or considered when searching for the divergent routes.

In another embodiment, searching for the divergent routes in the database 392 involves evaluating and/or considering a portion of the routes stored in the database (e.g., randomly selecting 10% of the routes in the database 392 and examining them to identify the divergent routes). Optionally, at least some routes belonging to the portion of the routes represent other routes (e.g., they are representatives of groups of related routes). Thus, if a representative route is deemed a divergent route, or close to being a divergent route, other routes in its group may be evaluated too.

In another embodiment, searching for the divergent routes in the database 392 involves filtering routes in the database according to elements in the template route 390. For example, the database 392 may be queried for routes that include a certain element belonging to the template route 390, and only routes containing the certain element are evaluated.

The subset selector 394 is configured to select from the divergent routes retrieved by the route retriever 393 a subset of divergent routes that are similar to each other. Optionally, the routes belonging to the subset are essentially the same. Optionally, the subset includes all the divergent routes retrieved by the route retriever 393. Alternatively, the subset includes at least one of the divergent routes, and at least one divergent route is not included in the subset. Optionally, the subset includes exactly one divergent route; alternatively, the subset may include two or more divergent routes.

In one embodiment, the subset includes divergent routes that are similar to each other, according to some measure of similarity. Optionally, the divergent routes in the subset are less similar to other divergent routes not in the subset, according the measure of similarity. In one example, the software systems are screen based, and similar divergent routes start from, and end with, the same screens. In another example, the software systems are screen based, and similar divergent routes have the same chain of screens but with different user keys. In still another example, similar divergent routes have the same changes in relation to the template route from which they arrived.

In one example, divergent routes belonging to the subset have a certain number of elements in common. For example, all divergent routes in the subset share a number of common screens. In another example, divergent routes belonging to the subset all have a minimal pairwise similarity between pairs of divergent routes in the subset. For example, the angle between a vector representation of any two divergent routes in the subset is smaller than a certain threshold. In yet another example, divergent routes returned by the route retriever 393 are clustered and the subset selector 394 selects a certain cluster of divergent routes as the subset.

In one embodiment, the subset selector 394 compares the divergent routes retrieved by the route retriever 393 to the template route 390, and includes in the subset only divergent routes that show at least a certain level of similarity to the template route 390. For example, all divergent routes must share a certain number of elements with the template route 390 (in addition to being similar to each other).

The template manipulator 395 is configured to manipulate the test scenario template according to the subset of divergent routes if the size of the subset reaches a predetermined threshold. A result of the manipulation may be a manipulated template 399. Optionally, the template manipulator 395 is also configured not to manipulate the test scenario template according to subset if the size of the subset does not reach the predetermined threshold.

In one embodiment, the predetermined threshold is selected to have a certain value that signifies a likelihood of general usefulness of divergent routes belonging to the subset; thus, the fact that the divergent routes in the subset have a sufficiently large utilization (as indicated by the size of the subset), indicates that the divergent routes in the subset are likely to be useful for other organizations too. If the subset is too small, this may indicate that the routes in the subset are utilized by a small number of users and/or organizations, and thus are not likely useful for other organizations.

In one embodiment, the predetermined threshold may be a fixed value. For example, a subset of at least two divergent routes. In another embodiment, the predetermined threshold may be proportional to various factors such as the number of the runs of the test scenarios, the number of users that ran the test scenarios, and/or the number of organizations associated with the runs of the test scenarios. In one example, the predetermined threshold increases with the number of different organizations, thus for instance, if there are 10 different organizations the predetermined threshold may be a subset of at least size 3, but if there are 100 different organizations, the predetermined threshold may be a subset of at least 10 divergent routes.

In one embodiment, manipulating a test scenario template by the template manipulator 395 involves updating the template so the manipulated template 399 is different from the template prior to the updating. In one example, updating the test scenario template may involve adding one or more elements found in the divergent routes in the subset to the test scenario template. Optionally, the one or more elements that are added are part of at least a predetermined proportion of the divergent routes belonging to the subset (e.g., the added elements appear in at least 50% of the divergent routes in the subset). Optionally, the one or more elements that are added are part of all the divergent routes belonging to the subset. In another example, updating the test scenario template may involve removing one or more elements found in the test scenario template that are not found in the divergent routes in the subset. Optionally, the one or more elements that are removed are not part of at least a predetermined proportion of the divergent routes belonging to the subset (e.g., the added elements appear in less than 50% of the divergent routes in the subset). Optionally, the one or more elements that are remove do not appear in any of the divergent routes belonging to the subset. In yet another, updating the test scenario template may involve changing order of one or more elements found in the test scenario template, according to an order of elements found in the divergent routes in the subset.

In another embodiment, manipulating a test scenario template by the template manipulator 395 involves generating a new test scenario template based on the test scenario template and one or more of the divergent routes in the subset. For example, the new template may include at least some of the elements from the test scenario template and at least some elements from divergent routes belonging to the subset. Optionally, the new template is generated by copying a pervious template and updating the copy.

In one embodiment, the computer system may optionally include a data cleaner 397 configured to select a value from the manipulated test scenario template 399, and remove the selected value from the manipulated template 399 if the selected value does not appear in runs of test scenarios that follow at least two divergent routes that are essentially the same as the certain divergent route. Optionally, the data cleaner 397 is also configured to check that the at least two divergent routes are associated with at least two different organizations. For example, there is at least a first run of a test scenario that follows a first registered divergent route that is essentially the same as the certain divergent route; there is at least a second run of a test scenario that follow a first divergent route that is essentially the same as the certain divergent route that follows a second registered divergent route that is essentially the same as the certain divergent route. Additionally, a first organization is associated with the first run, and a second different organization, is associated with the second run. Optionally, the manipulated template 399 may refer to an updated template or a newly generated template, depending on what manipulation the template manipulator 395 is configured to perform.

In one embodiment, the computer system may also optionally include a monitoring module 352 that is configured to monitor the users 350 belonging to the different organizations and to provide the activity data 353 obtained from monitoring the users 350 to the test identifier 354.

In another embodiment, the computer system may also optionally include a user interface 398 configured to suggest to a user to run an instantiation manipulated test scenario template. Optionally, the user interface 398 may initiate the instantiation of the manipulated test scenario template; for example, the user interface 398 may present a first screen belonging to the manipulated test scenario template and prompt a user to take a certain action to advance execution.

In another embodiment, the computer system may also optionally include a ranking module 396 configured to rank templates, such as, the manipulated test scenario template 399. Optionally, ranking the manipulated template 399 is done according to the size of the subset of divergent routes selected by the subset selector 394; for example, the larger the subset, the higher the manipulated template 399 is ranked. In one example, ranking involves ordering templates according to size of their corresponding subset of divergent routes. In another example, ranking involves assigning templates scores proportional to the size of their corresponding subset of divergent routes. In still another example, ranking involves ordering templates according to number of different organizations associated with routes belonging to their corresponding subsets. The larger the number of organizations associated with runs that followed divergent routes in a subset, the higher the rank of the manipulated template 399.

It is to be noted that different embodiments may implement components of the computer systems illustrated in FIG. 6 and/or FIG. 7 in different ways. For example, in some embodiments one or more of the following may be implemented by the same software module and/or software modules running on the same processor: the monitoring module 352, the test identifier 354, the route analyzer 391, the database 392, the route retriever 393, the subset selector 394, the template manipulator 395, the ranking module 396, the data cleaner 397, and the user interface 398. Optionally, one or more of the aforementioned components may be implemented on a remote server, such as a cloud-based server.

In one example, the route analyzer 391, the route retriever 393, and/or the subset selector 394 may be implemented, at least in part, as part of the database 392. For example, they may involve software modules that belong to the database 392. In another example, the route analyzer 391, the route retriever 393, and/or the subset selector 394 may be implemented by the same software module that interacts with the database 392. In yet another example, the ranking module 396 and/or the data cleaner 397 are implemented as part of the template manipulator 395.

In one embodiment, the test identifier 354, the route analyzer 391, the database 392, the route retriever 393, the subset selector 394, and/or the template manipulator 395, are implemented as a cloud-based service that receives the activity data 353 of the users and manipulates templates to better suit the needs of the users. For example, the manipulated routes may test elements in a new and/or different way. Optionally, the ranking module 396 and/or the data cleaner 397 may also be part of the cloud-based service.

Figure 8:
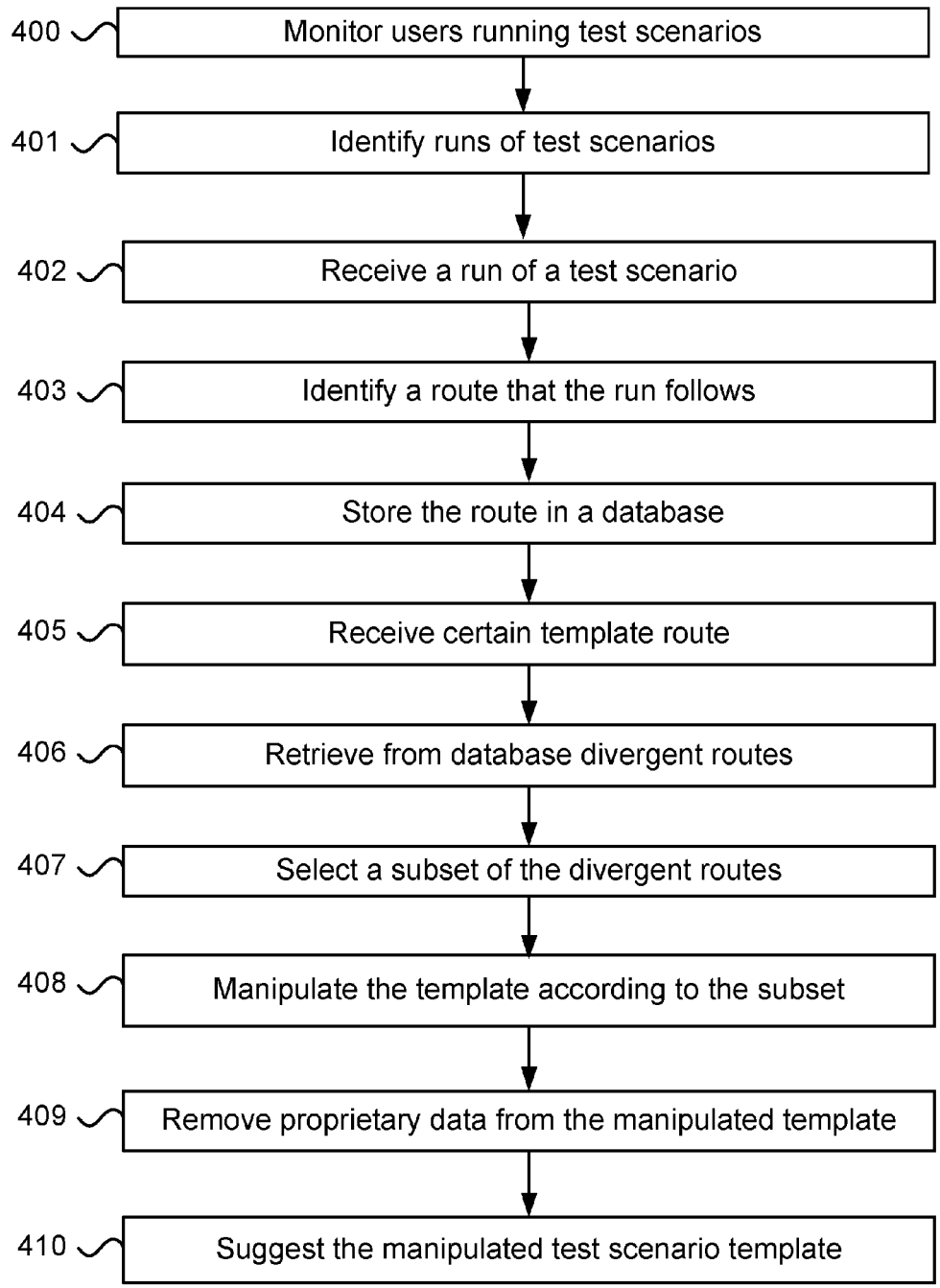
FIG. 8 illustrates one embodiment of a computer implemented method for utilizing routes followed by runs of test scenarios to manipulate a test scenario template.

FIG. 8 illustrates one embodiment of a computer implemented method for utilizing routes followed by runs of test scenarios to manipulate a test scenario template. The illustrated embodiment includes the following steps:

In step 401, identifying runs of test scenarios run by users belonging to different organizations on software systems associated with the different organizations.

In step 402, receiving a certain run of a test scenario; the certain run may be one of the runs identified in step 401.

In step 403, identifying a route that the certain run follows. Optionally, a route defines a sequence of one or more elements involved in running a test scenario. Optionally, an element is selected from the group consisting of test steps, transactions, and screens.

In step 404, storing route in the database 392.

In step 405, receiving a certain template route belonging to a test scenario template; the test scenario template is associated with a certain organization that does not belong to the different organizations. Optionally, the different organizations and the certain organization are associated with different fields of operation. For example, the certain organization is in the travel business, while the different organizations are in finances, health services, or automobile manufacturing. Alternatively, the different organizations and the certain organization are associated with a same field of operation. For example, they all operate in the field of internet commerce.

In step 406, retrieving from the database 392 divergent routes that diverge from the template route. Optionally, a divergent route is characterized by a different sequence of elements compared to sequence of elements defined by the template route. Optionally, the divergent routes involve identifying routes that diverge from the template route and later on converge back to the template route. Additionally or alternatively, retrieving the divergent routes may involve identifying routes that diverge from the template route and do not converge back to the template route. Additionally or alternatively, retrieving the divergent routes may involve identifying divergent routes that merge with the template route.

In step 407, selecting from the divergent routes a subset of divergent routes that are similar to each other.

And in step 408, if the size of the subset reaches a predetermined threshold, manipulating the test scenario template according to the subset. Optionally, the predetermined threshold is selected such that reaching the predetermined threshold indicates that the essentially the divergent routes belonging to the subset are also likely to be useful for other organizations. Optionally, the predetermined threshold is at least two divergent routes.

Optionally, if the size of the subset does not reach the predetermined threshold, step 408 involves refraining from manipulating the test scenario template according to the subset. Not reaching the predetermined threshold indicates that the divergent routes are not likely to be a suitable option for an organization associated with runs that follow the certain divergent route. Additionally, a number that does not reach the predetermined threshold may indicate that the divergent routes are too specific, and are likely useful primarily for the organizations that ran them.

In one embodiment, manipulating the test scenario template according to the subset involves updating the test scenario template according to one or more of the divergent routes in the subset; for example, a new screen belonging to the divergent routes in the subset, which did not appear in the template, is added to the test scenario template.

In another embodiment, manipulating the test scenario template according to the subset involves generating a new test scenario template based on the test scenario template and one or more of the divergent routes belonging to the subset. For example, elements from the divergent routes in the subset are combined with elements in the existing test scenario template in order to generate a new template with a combination of elements that is not possessed by the test scenario template and possibly any of the divergent routes in the subset.

In one embodiment, the computer implemented method includes an additional optional step 410 involving suggesting to a user to run an instantiation of the updated test scenario template. For example, the user interface 398 may utilized to present the updated template to the user.

In one embodiment, the computer implemented method includes an optional step 400, which involves monitoring the users and providing the activity data 353 obtained from the monitoring for use in the identifying of the runs of test scenarios.

In another embodiment, the computer implemented method includes an optional step 409 that involves selecting a value from the manipulated test scenario template, and removing the selected value from the manipulated test scenario template if the selected value does not appear in runs that follow at least two of the divergent routes belonging to the subset. Optionally, step 409 also involves testing that the at least two of the divergent routes are associated with at least two different organizations.

In one embodiment, the computer implemented method illustrated in FIG. 8 includes an optional step of ranking the manipulated test scenario template according to the number of the divergent routes belonging to the subset. Additionally or alternatively, ranking the manipulated test scenario template may be done according to the number of different organizations associated with the divergent routes belonging to the subset.

In one embodiment, a non-transitory computer-readable medium stores program code that may be used by a computer to utilize routes followed by runs of test scenarios to manipulate a test scenario template. The computer includes a processor, and the non-transitory computer-readable medium stores the following program code:

Program code for identifying runs of test scenarios run by users belonging to different organizations on software systems associated with the different organizations.

Program code for receiving a certain run of a test scenario.

Program code for identifying a route that the run follows.

Program code for storing the route in a database.

Program code for receiving a certain template route belonging to a test scenario template. Optionally, the test scenario template is associated with a certain organization that does not belong to the different organizations.

Program code for retrieving from the database divergent routes that diverge from the template route.

Program code for selecting from the divergent routes a subset of divergent routes that are similar to each other.

And program code for manipulating the test scenario template according to the subset if the size of the subset reaches a predetermined threshold.

In one embodiment, the program code for manipulating the test scenario template according to the subset includes program code for updating the test scenario template according to one or more of the divergent routes belonging to the subset.

In another embodiment, the program code for manipulating the test scenario template according to the subset includes program code for generating a new test scenario template based on the test scenario template and one or more of the divergent routes belonging to the subset.

In one embodiment, the program code stored in the non-transitory computer-readable medium optionally includes program code for refraining from manipulating the test scenario template according to the subset if the size of the subset does not reach the predetermined threshold. Not reaching the predetermined threshold indicates that the divergent routes belonging to the subset are not likely to be a suitable alternative to the template route, for other organizations.

In one embodiment, the program code stored in the non-transitory computer-readable medium optionally includes program code for selecting a value from the manipulated test scenario template, and removing the selected value from the manipulated test scenario template if the selected value does not appear in runs that follow at least two of the divergent routes belonging to the subset. Optionally, the program code also involves testing that the at least two of the divergent routes are associated with at least two different organizations.

Monitoring Users and Identifying Runs

Some of the disclosed embodiments involve software systems that may be characterized as being data-oriented large-scale software systems. Examples of data-oriented large-scale software systems include Enterprise Resource Planning (ERP), such as from the following trademarks: SAP, Oracle Application, The Sage Group, Microsoft Dynamics, and SSA Global Technologies; billing systems (also known as revenue management) such as from the following trademarks: Amdocs, Comverse Inc., and Convergys Corporation; service management systems; and portfolio management systems. Installing, upgrading, and/or maintaining such systems require running many tests in order to validate the systems' behavior.

In this disclosure, users are often referred to as being monitored. This monitoring typically concerns activity of the user on a software system being tested. A monitored user may be a human (e.g., performing a certain test) and/or a system module (e.g., a module initiating the running of a certain procedure).

In one embodiment, a test scenario refers to a functional and/or a technical specification for testing a business process and/or one or more transactions. A test scenario may specify how to test one or more business processes, business requirements, test conditions, logical data, and/or expected results of tests.

In one embodiment, runs of test scenarios are identified and/or obtained based on data collected from monitoring users. For example, monitoring of a user may involve collection of data related to inputs provided by a user to a system, along with the transactions that were run, and results of the transactions. This data may be used to identify runs of test scenarios that describe test steps taken by a user and a result of executing the test steps on the software system.

In another embodiment, monitoring a user is done in order to obtain activity data of a user on a software system. The activity data may include data related to inputs provided by the user and/or other sources to the software system, outputs generated by the software system, and/or intermediate values generated by the software system (e.g., temporary files generated by the system, network traffic of the system, and/or content of memory belonging to the system). Optionally, the activity data may be utilized in order to identify runs of test scenarios.

In some embodiments, users perform at least part of their interaction with a software system via a user interface that includes a display that displays screens. Optionally, a screen may refer to a presentation of a certain form through which a user may access, modify and/or enter data. Optionally, a screen includes one or more fields. Optionally, a field may have a certain name and/or identifier. Optionally, a field may have an associated value, which may be referred to herein as a "field value". The field value may or may not be presented on the screen. Optionally, the user is able to edit certain field values, while other field values may not be editable by the user. Optionally, certain field values may be required values, which the user must enter before completing a screen. Optionally, field values from a screen may correspond to one or more database entries. For example, a screen displaying customer details (e.g., name, address, telephone number) may correspond to a record of the customer in a customer database.

In one embodiment, monitoring users involves monitoring certain transactions and/or business processes that were executed by the users, as part of running test scenarios. Optionally, monitoring users may involve monitoring which programs executed by the users, along with invocation values of the users and/or return values of the programs.

In one embodiment, monitoring a user may involve recording and/or processing inputs the user provides to the software system (e.g., via a keyboard, mouse click, visual cue). Additionally or alternatively, the inputs may include digital data transmitted to the system (e.g., a file of digital data). In another example, monitoring a user may involve recording and/or processing outputs generated by the software system. Such outputs may include, values presented on a screen, written in a file, printed, and/or provided in the form of auditory cues. The outputs may be presented to the user and/or provided to other recipients. In yet another example, monitoring a user may involve utilization of internal state data of the software system; data that may not have been directly provided by the user and may also not be directly provided to the user (e.g., memory content, database activities, and/or network traffic).

In some embodiments, users performing tests may be given instructions and/or scripts describing some of the steps involved in a certain test (e.g., which procedures to run, what buttons to push, and/or what values to provide the system). Optionally, such instructions and/or scripts may be given in electronic form (e.g., a computer file or instructions on a screen) and may be recorded and/or processed as part of monitoring a user.

As described in some embodiments in this disclosure, monitoring a user running test scenarios on a software system may be performed by a monitoring module. Optionally, the monitoring module is, and/or utilizes, a software module that interacts with the software system on which the test scenarios are run, in order to obtain data related to activity of the user on the software system. Optionally, the monitoring module is implemented, at least in part, as part of the software system. For example, the monitoring module may include one or more programs that are part of a distribution of the software system. Additionally or alternatively, the monitoring module may be implemented, at least in part, separately from the software system. For example, the monitoring module may include programs that are not part of the software system (e.g., not included in a distribution of the software system). In another example, the monitoring module may include programs that run on hardware that does not run the programs belonging to the software system; e.g., the monitoring module may run programs on different servers than servers on which the software system runs programs. Optionally, the monitoring module is implemented, at least in part, on hardware remote from hardware that runs the software system. For example, a software system may run on hardware located at a certain organization, while the monitoring module may run, at least in part, on remote cloud-based servers that are not associated with the certain organization.

In some embodiments, the monitoring module may receive data from the software system that is intended for the monitoring module (e.g., the software system may explicitly send the monitoring module data describing activity on the software system). Additionally or alternatively, the monitoring module may intercept and/or examine data of the software system that is not intended primarily for the monitoring module. For example, the monitoring module may sniff network traffic that involves message exchange between modules of the software system as part of the normal operation of the software system.

In some embodiments, a run of a test scenario may include identifiers of business processes, transactions, and/or system commands that were executed while running the test scenario. Additionally or alternatively, a run of a test scenario may include values that were provided to a software system (e.g., input values in a screen), values generated by the software system (e.g., outputs from a transaction), and/or internal values of the software system (e.g., intermediate values generated by a transaction). Additionally or alternatively, a run of a test scenario may include state information about systems involved in running the test scenario (e.g., the state of certain system resources, and/or performance data such as CPU load or network congestion), and/or information about a user running the test scenario (e.g., organization affiliation, department, job title, permissions). Optionally, a certain test step, transaction, command or procedure is said to be described and/or included in a run of a test scenario if the run of the test scenario indicates that the certain test step, transaction, command, or procedure was executed as part of running the test scenario. Optionally, examining the run of the test scenario may reveal a value associated with the certain test step, transaction, command, or procedure. Additionally, examining the run of the test scenario may reveal a behavior of the system with respect to the certain test step, transaction, command, or procedure. For example, a run of a test scenario may indicate whether or not a certain transaction, involved in the running of the test scenario, produced an error message.

In one embodiment, identifying a run of a test scenario from data obtained from monitoring one or more users is done as part of the process of monitoring the users. For example, a user may be monitored for a session, which is a certain period of time that corresponds to running of a certain test scenario. Each session may start when the running of the certain test scenario starts (e.g., when a first screen is presented to a user), and may end when the running ends (e.g., after the user enters a last value involved in the test scenario). Thus, any data recorded during the session may be easily identified as belonging to a run of the certain test scenario.

In one embodiment, the action of monitoring a user and the action of identifying a run of a test scenario from data obtained from the monitoring are performed separately. For example, monitoring may generate bulk data corresponding to activity of one or more users. Identifying runs in the bulk data may require parsing the data to identify certain portions of interest, such as transactions executed by each of the users and/or inputs and outputs of each of the users. In one example, identifying runs involves detecting in the data obtained from monitoring signals that denote a start and/or end of a run. Optionally, the signals may be explicit, such as explicit tags in the data that denote a start of running a test and/or end of running a test scenario. Alternatively or additionally, the signals may be implicit. For example, a user entering data after not doing so for a while may signal a start of a run; while having a user stop entering data, and not entering further data for a prolonged period may signal an end of a run. In another example, the fact that a user performs a certain transaction may signal a start of a run, such as entering data in a screen labeled "begin new client record". Similarly, certain transactions may signal an end of a run, such as entering data in a screen labeled "finalize new client". In yet another example, identifying a run of a test scenario may involve selecting certain types of data and/or amounts of data that are to be included in the run. For example, while monitoring a user may involve collection of various types of data, in a certain system, runs of test scenarios may include only descriptions of screens presented to a user while interacting with the certain system. Thus, in this example, identifying runs may involve identifying and retaining descriptions of screens.

The process of identifying runs of test scenarios of a certain user may utilize, in some embodiments, data collected from other users. For example, determining boundaries of a test scenario, such as determining at what screen a run of the test scenario typically starts, and at what screen it ends, may be based on examination of data obtained from multiple users. In the examination of the data, certain common screens that appear in data from multiple users may be detected, and runs of test scenarios may be restricted to begin and/or end with a description of at least one of the common screens. Alternatively or additionally, identifying runs of test scenario run by a certain user, may involve examination of data obtained primarily from monitoring the certain user.

As described in some embodiments in this disclosure, identifying runs of test scenarios run by users on software systems may be performed by a test identifier. In some embodiments, the test identifier receives data from the monitoring module. Optionally, the test identifier and monitoring module are realized by the same software module and/or same hardware. In one example, one program may perform at least some of the operations involved in monitoring the users and identifying the runs. In another example, programs that perform at least some of the operations involved in monitoring the users and identifying the runs of test scenarios, run on the same servers.

In one embodiment, the monitoring module runs, at least in part, on hardware that is different from hardware on which at least some of the actions of the test identifier are performed. For example, a monitoring module that monitors users belonging to a certain organization may run, at least in part, on servers belonging to the certain organization. However, a test identifier, which receives data from the monitoring module, may run on remote servers belonging to, or controlled by, a different organization, such as an organization that provides analysis services to the certain organization.

Crowd Testing Data

Some aspects of this disclosure involve utilization of runs of test scenarios run by users belonging to, or associated with, different organizations. Optionally, a group of users running test scenarios may be referred to as a "crowd" or "crowd users". Optionally, crowd users do not run test scenarios in a coordinated effort, such as users belonging to different organizations that do cooperate to run test scenarios to test a certain software system that belongs to a certain organization, or users making a coordinated effort to test certain aspects of their software systems. Rather, as typically used in this disclosure, the users belonging to the different organizations run test scenarios to test software systems of their respective organizations, and do so essentially independently of each other.

In some embodiments, a first organization and second organization are considered different organizations if the first organization has a different ownership structure (e.g., a different composition of shareholders) than the second organization. Additionally or alternatively, two organizations may be considered different organizations if they have different employees, and/or different members of management.

In one embodiment, a user may be considered to belong to an organization and/or may be considered to be associated with the organization, if the user has a certain relationship with the organization such as being an employee of the organization, a member of the organization, and/or contracted to work for the organization. Additionally or alternatively, a user may belong to an organization, and/or be associated with the organization, if the worker performs work that is directly or indirectly done on behalf of the organization. For example, an employee of a first organization may be considered associated with a second organization if the employee runs, as part of her duties, tests that involve a system of the second organization. As used herein, the terms "associated" and "belongs" may be used interchangeably when referring to a user being associated with an organization or a user belonging to an organization.

Some aspects of this disclosure involve utilization of runs of test scenarios run on software systems belonging to different organizations and/or associated with the different organization. Optionally, a software system may be considered to belong to a certain organization and/or may be considered to be associated with a certain organization if the software system runs, at least in part, on hardware belonging to the organization and/or paid for by the organization (e.g., software running on cloud-based servers billed to the organization). Additionally or alternatively, a software system may be considered to belong to an organization and/or be associated with the organization if a user from the organization runs test scenarios, which run at least in part, on the software system. As used herein, the terms "associated" and "belongs" may be used interchangeably when referring to a software system being associated with an organization or a software system belonging to an organization.

Some embodiments in this disclosure involve monitoring multiple users belonging to different organizations. In some embodiments, each user belongs to a single organization. For example, 100 different users may belong to 30 different organizations; some organizations may have a single user that belongs to them, while other organizations have multiple users that belong to them. In some embodiments, users may belong to more than one organization. For example, 100 different users may belong to 150 different organizations; in this example, some of the users belong to more than one different organization.

In the embodiments, some of the systems on which test scenarios are run may be data-oriented large-scale software systems. Optionally, the software systems are packaged applications having multiple modules. Optionally the software systems may be considered similar to each other if the software systems use in a similar manner one or more modules of the same type (possibly having different versions). Additionally or alternatively, the software systems may be considered similar if they contain one or more modules with a similar function (e.g., modules that manage sales, stocking, or human resources).

In some embodiments, analyzing runs of test scenarios obtained from monitoring running of test scenarios by a crowd of users, on software systems of multiple organizations, may help gain certain insights that may not be easily attained from analysis obtained from runs associated with a single organization. For example, runs of test scenarios obtained from monitoring a crowd may help gain insight into the general applicability of certain test scenarios and/or test steps for testing certain components of the systems, such as modules, business process, and/or transactions. Based on the fact that multiple organizations run test scenarios to test certain components, it may be postulated that a different organization should also run similar test scenarios; this may be especially true if the different organization is in the same field of operations as the multiple organizations.

In some embodiments, analyzing runs of test scenarios obtained from monitoring running of test scenarios on systems of multiple organizations may also help gain insight into the commonality of certain aspects of the systems, as indicated by their reoccurrence in the runs. Such insight may be used, in some embodiments, to deduce whether a certain aspect is particular to a single organization, or a small number of organizations from the multiple organizations. Alternatively, it may be deduced, the certain aspect may be rather general and may be associated with a relatively large portion of the multiple organizations. For example, runs of test scenarios associated with multiple organizations may include a field which is given a value in each run of the test scenarios. If a certain value is entered in a large proportion of the runs (the same certain value is entered in each run of the large proportion or runs), then the value may be considered a default value or a general value. In this case, knowing the certain value may not assist much to identify a specific organization which is associated with a run from which the certain value was taken. However, if a certain value appears only in runs of a single organization, or in a small proportion of the runs, then the value may be considered a unique and/or proprietary value. In this case, knowing the certain value may assist to identify a specific organization which is associated with a run from which the certain value was taken. Thus, in some embodiments, monitoring runs of test scenarios associated with multiple organizations may help discover non organization-specific default values that can be used for running test scenarios of other organizations. Additionally, the same analysis may help identify what data in the runs may be considered proprietary.

Routes and Divergent Routes

A route, as used in some embodiments described in this disclosure, defines a sequence of one or more elements involved in the running of a test scenario. Optionally, an element may be a test step, a transaction, and/or a screen. Optionally, a run of the test scenario, such as a run obtained from monitoring a user running the test scenario, describes the sequence of one or more elements involved in the running of the test scenario. For example, the run of a test scenario may describe the test steps performed while running the test scenario, the transactions executed while running the test scenario, and/or the screens presented to a user while the user ran the test scenario.

In one embodiment, a test scenario template defines certain elements that are to be executed when running an instantiation of the template, and an order of execution of the elements in the instantiation. The template may include logic that determines the order according to runtime parameters. Thus, a test scenario template defines one or more routes (also referred to as "the template route/s") that may be associated with the template. Execution of an instantiation of the template, i.e., running a test scenario based on the template, is expected to follow the template route/s. For example, if a template includes screens 1-4 (and in that order), an instantiation of the template is expected to present screen 1, followed by screen 2, screen 3 and then screen 4.

In some embodiments, by examining a run of the test scenario it may be determined whether during the running of the test scenario a certain route was followed or not. For example, if a sequence of one or more elements described in the run corresponds to the sequence of the route, then it may be assumed that the run follows the route. Conversely, if the sequence of one or more elements described in the run diverges from the sequence of the route, then it may be assumed that the run diverges from the route.

In one embodiment, a test scenario template may have more than one route that may be treated as a template route. Optionally, the template may include alternative test steps that may depend on a choice made by a user. For example, when a user attempts to update a record, according to the template, certain test steps are conducted if the update is successful, while other steps are to be conducted if the update attempt returns an error. In another example, a screen belonging to the template provides the user with an option, such as setting the price of a part. Based on the price range, certain actions may be required: with a price of below $1000 the user may continue as usual, however, a price of $1000 or more requires the user to fill out a screen that generates a request for manager approval. Thus, when examining routes a template test scenario may define, it is possible for there to be more than one template route.

There may be various relationships between routes (e.g., different routes identified in multiple runs of test scenarios). For example, routes may be distinct of each other (e.g., they do not contain any essentially similar elements). In another example, a first route may be contained or partially contained in a second route (e.g., there are one or more elements that are essentially the same in both of the first and the second routes). In the latter case, the first and/or the second routes may be considered divergent routes, and/or one of the two routes may be considered to diverge from the other. In particular, herein we may consider a route that diverges from a template route. Optionally, in cases where a certain test scenario template may have a multiple template routes, a route may be considered a divergent route if it diverges from all of the multiple template routes.

A divergent route does not completely follow a route to which it is compared, such as a template route. By "not completely follows" it is meant that there is a substantial difference between the divergent route and the route to which it is being compared, such as an element not shared by both routes. In one embodiment, a divergent route is characterized by a different sequence of elements compared to a sequence of elements defined by the template route, and/or different configurations of the transactions used by the process under test. For example, the sequence of the divergent route may include a transaction not included in the sequence of the template route. In another example, the sequence of the divergent route may be missing a transaction that is in the sequence of the template route. In yet another example, the sequence of the divergent route includes at least one transaction that is executed out of order, with respect to an order of executing transactions that is defined by the template route.

In some embodiments, for a first route to be considered a divergent route with respect to a second route, the first and second routes must have a certain degree of similarity. Optionally, the first and second routes need to be considered similar to each other. Additionally, the first and second route may need to be considered essentially the same. Additional information regarding how to interpret routes that are similar and/or essentially the same is given below.

Routes followed by runs of test scenarios may diverge from their respective template routes for various reasons.

In one example, different organizations may configure and/or use their systems in different ways. The different configurations and/or ways of using the systems may change the behavior of the transactions, and as a result, may change the test scenarios that correspond to the transactions that behave differently. Optionally, the different configurations may lead to a different choice of transactions that are to be executed in a test scenario, and/or a different order of execution of the transactions. In one example, a different choice of transactions and/or order of execution may represent an alternative way to perform a certain task. Though a task is typically performed in a first organization in a first method, which corresponds to a first route, it may be performed in another way, such as the way it is performed by a second organizations, represented by a second route. Thus, the second route, which may be considered a divergent route with respect to the first, may be a legitimate method for performing the task, and follow a route that a user of the first organization may actually end up following (e.g., through inadvertent configuration change or serendipitous discovery of the user). Thus, it may be advantageous for the first organization to also test the second route.

In one example, a manual test scenario is interpreted by a user and executed by a processor. The manual test scenario may be based on a certain template (e.g., a script given to the user), and as such, executing the script should lead to a run of the test scenario that follows the template route. However, as the user runs the test scenario, the user may perform certain actions that do not follow the script; for example, the user may determine that certain test steps in the script are incorrect or irrelevant and thus should not be performed. Thus, decisions, reactions, and/or adaptations made by a user running a manual test scenario can lead to divergent routes.

In another example, a test scenario may be an automatic test scenario that is interpreted and executed by a processor. The automatic test scenario may have a certain template (e.g., commands that execute a sequence of test steps), and as such, executing the automatic test scenario should lead to a run of the test scenario that follows the template route. However, there may be cases in which the automatic test scenario utilizes randomly generated or randomly selected values. For example, to automatically fill certain fields, the automatic test randomly generates values, or selects certain random records from a database. Such an element of randomness which may introduce unexpected values into a run of the automatic test scenario may lead to unexpected behavior of the system (e.g., generation of certain errors or execution of different transactions than were expected). Thus, a run of an automatic test scenario may end up following a divergent route that diverges from its template route.

In yet another example, a semiautomatic test scenario, which is a combination of the aforementioned manual test scenario and automatic test scenario, is run by a user. The semiautomatic test scenario may end up not following its template route due various reasons, as described above. For example, actions of the user (e.g., values entered by the user) may lead to unexpected behavior of the system. Similarly, values randomly generated or automatically selected by the system may also lead to unexpected behavior while running the semiautomatic test scenario. Thus, a run of a semiautomatic may end up diverging from its intended template route.

A divergent route that diverges from a template route may do so in various ways. A route analyzer may be configured to identify various types of divergent routes, which diverge in different ways from the template route.

Figure 10A:
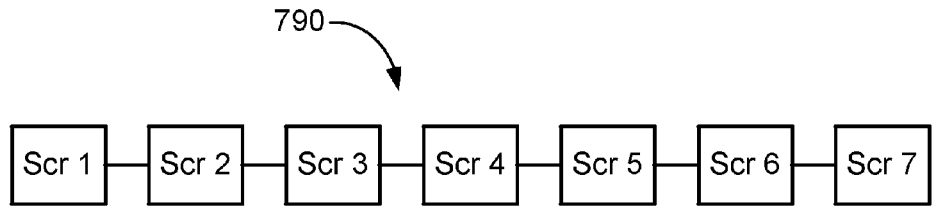
FIG. 10A illustrates a template route that includes a sequence of seven screens.
Figure 10B:
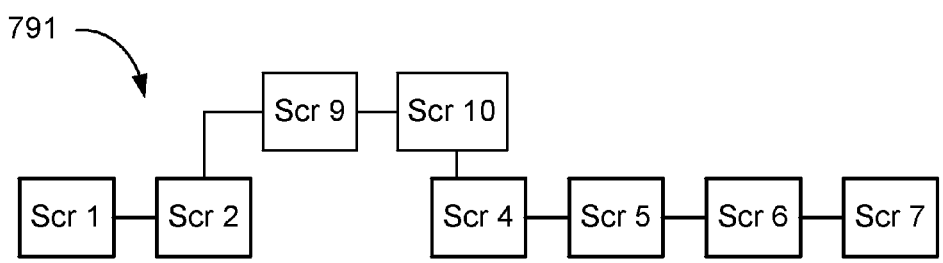
FIG. 10B illustrates a divergent route that diverges from the template route and later on converges back to the template route.

In one embodiment, a route analyzer is configured to identify divergent routes that diverge from the template route and later on converge back to the template route. FIG. 10A illustrates a template route 790 that includes a sequence of seven screens (SCR1 to SCR7) that are to be executed in that order. In one example, as illustrated in FIG. 10B, a divergent route 791 includes screens 1,2, and then two screens not included in the template route, screens 9 and 10, and then includes screens 4,5,6, and 7 from the template route. Note that screen 3 from the template route is not part of the divergent route, but that need not be the case in all examples. In other examples, a divergent route that diverges from the template route and later on converges back to the template route may include all the elements of the template route and in addition some elements that are not part of the template route.

Figure 10C:
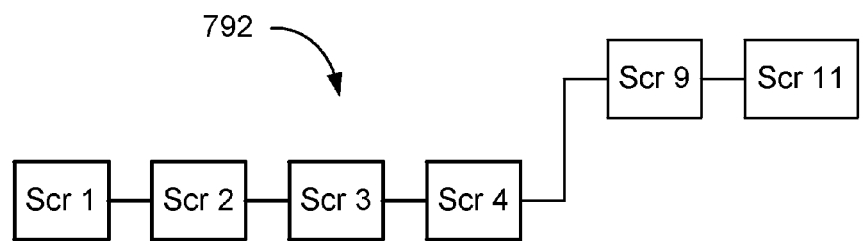
FIG. 10C illustrates a divergent route that diverges from the template route and does not converge back to the template route.

In another embodiment, a route analyzer is configured to identify divergent routes that diverge from the template route and do not converge back to the template route. In one example, as illustrated in FIG. 10C, a divergent route 792 that diverges from the template route 790 does not include screens 5,6, and 7 from the template route 790. Additionally, the divergent route 792 includes screens 9 and 11, which are not part of the template route 790. Note that even though screens 5,6, and 7 from the template route are not part of the divergent route, which need not be the case in all examples. In other examples, a divergent route that diverges from the template route and does not converge back to the template route may include all the elements of the template route and in addition some elements that are not part of the template route that are to be executed after the elements of the template route.

Figure 10D:
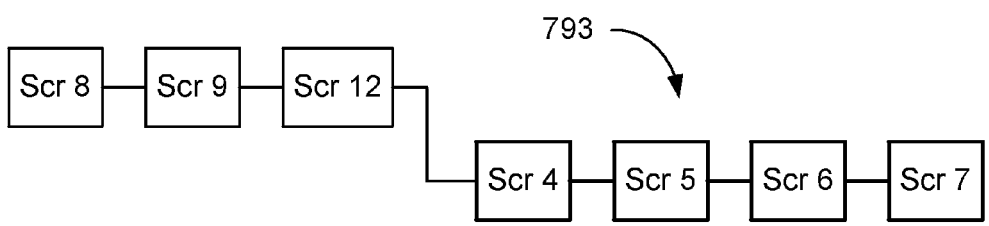
FIG. 10D illustrates a divergent route that merges with the template route.

In yet another embodiment, a route analyzer is configured to identify divergent routes that merge with the template route. A divergent route 793 illustrated in FIG. 10D includes screens 8,9, and 12, which are not part of the template route 790, and then four screens that are part of the template route 790 (screens 4,5,6, and 7). Note that screens 1,2, and 3 from the template route 790 are not part of the divergent route 793, but that need not be the case in all examples. In other examples, a divergent route that merges with the template route may include all the elements of the template route and in addition some elements that are not part of the template route that are to be executed before the elements of the template route and/or after it.

In one embodiment, a route from identified in a run of a test scenarios (i.e., the run follows the route), may be stored in a database. Optionally, the route may be a divergent route with respect to a certain template route corresponding to a certain test scenario template. Optionally, storing the route involves recording the run and/or information extracted from the run in the database. Additionally or alternatively, storing the route may involve recording elements of the route (e.g., test steps, transactions, and/or screens) in the database. Additionally or alternatively, storing the route may involve storing a value computed from the run and/or the route, such as a hash value computed from screen identification numbers and/or transaction identification numbers. Optionally, storing a divergent route that diverges from a template route may involve storing information related to the template route and/or a test scenario template which defines the template route. Optionally, storing a divergent route that diverges from a template route may involve storing information regarding one or more differences between the route and the template route.

In one embodiment, storing a route may involve taking note of information pertaining to a certain user that ran a run which follows the route, and/or a certain organization associated with the run. In one example, storing a route involves adding the certain user and/or the certain organization to a list corresponding to the route. In another example, storing a route involves incrementing a counter corresponding to a number of users and/or incrementing a counter that corresponds to a number of organizations. Optionally, maintaining the aforementioned lists and/or counters may enable determination of popularity of certain routes with users and/or organizations in general, and/or popularity of certain routes with specific users and/or specific organizations.

In one embodiment, a route stored in a database may be processed. For example, the route may be processed before being received by the database, processed by the database (e.g., before storage and/or after retrieval), and/or processed after being delivered from the database.

In one example, processing a route may involve selecting certain types of elements to be included in the route. For example, processing a route may involve retaining transactions included in the route, while other types of elements such as descriptions of screens are not stored.

In another example, processing a route may involve altering values included in elements belonging to the route. For example, data such as numbers or addresses may be converted to a certain format. Additionally or alternatively, values may undergo filtering, noise removal, and/or stemming of text. Altering values included in elements may assist in standardizing stored routes and make it easier to retrieve and/or compare routes.

In yet another example, processing a route may involve filtering elements according to their popularity. For example, certain elements that are not utilized in a sufficient number of routes, by a sufficient number of users, and/or be associated with a sufficient number of organizations may be excluded from a stored route. Low utilization may indicate that the excluded elements are not likely to be useful for other organizations.

In still another example, processing a route may involve removing elements that are considered proprietary and/or removing values that may be considered proprietary. For example, if screens included in a route include proprietary field values, those values may be removed or replaced with default values.

In some embodiments, similarity between two routes may be characterized in different ways. For example, the two routes may be characterized as being "similar to each other" and/or "essentially the same". Both terms indicate that the two routes have a degree of similarity between them (e.g., they have certain elements in common); however, as used herein, the term "essentially the same" typically indicates a higher level of similarity between two routes compared to similarity indicated by the term "similar to each other". Usually, as used herein, any two routes that are referred to as being essentially the same may also be considered similar to each other, but the converse is not necessarily true.

In one embodiment, two routes are essentially the same if they contain the same exact elements. For example, the two routes involve the same screens (e.g., as determined by the fields in the screens and/or screen identification codes). In another example, two routes that are essentially the same involve execution of the same transactions (e.g., as determined from commands involved in the transactions and/or transaction identifiers). Optionally, the two routes that are essentially the same may have different values associated with one or more elements that are the same in both routes. For example, two routes may be considered essentially the same if they contain the same screens (e.g., the screens may have the same identification numbers); however, different customizations done to elements of each route may cause certain field names and/or default values for fields to be slightly different in the screens corresponding to the two routes.

In another embodiment, two routes may be considered similar to each other and/or essentially the same if they involve similar elements. For example, the two routes involve the similar screens (e.g., as determined by similar composition of fields in the two screens and/or similar values utilized by the two screens identification codes). In another example, the two routes may involve execution of the similar transactions (e.g., as determined from similarity in commands involved in the transactions and/or similar transaction identifiers).

Similarity between routes may depend on the number and/or proportion of same or similar elements shared by the routes. In one example, if two routes contain at least a first number of same elements, they may be considered similar to each other; and if the two routes contain at least a second number of same elements, they may be considered essentially the same. In this example, the second number may be higher than the first number. For example, two routes may be considered similar if they both involve executing 3 identical transactions, and they may be considered essentially the same if they both involve executing 7 identical transactions. In another example, if two routes have at least a first proportion of similar elements, they may be considered similar to each other; and if the two routes contain at least a second proportion of similar elements, they may be considered essentially the same. In this example, the second proportion may be higher than the first proportion. For example, two routes may be considered similar to each other if at least 50% of the screens in a first rout of the two routes are similar to the screens in the second route of the two; furthermore, if at least 80% of the screens in the first route are similar to the screens in the second route, the two routes may be considered essentially the same.

In yet another embodiment, similarity between two routes is determined according to a distance metric that indicates that the distance (difference) between them. Optionally, if a distance between the two routes is below a first threshold, the two routes are considered similar to each other; and if the distance below them is below a second threshold, they are considered essentially the same. Optionally the second threshold is lower than the first. A distance metric may also express a level of similarity between routes. In such a case, if similarity between two routes exceeds a first threshold, the two routes may be considered similar to each other, and if the similarity exceeds a second threshold, possibly higher than the first, the two routes may be considered essentially the same.

In one example, routes are represented as a sequence of transaction identifiers. A distance metric between two routes may be a standard sequence similarity metric, such as edit distance or Manhattan distance. In this example, two routes may be considered essentially the same if the edit distance and/or the Manhattan distance is below a predetermined threshold; for instance, the predetermined threshold may be 20% of the length of the longest sequence corresponding to one of the routes.

In another example, routes may be converted to a vector representation. For example, each element may correspond to one or more dimensions in a vector space. Optionally, certain vector dimensions may correspond to the presence of certain elements (e.g., a value of 1 is given if the element is present in a route and 0 otherwise). Optionally, certain vector dimensions may correspond to values associated with elements in the routes. Those skilled in the art may recognize that there are various ways in which a route may be represented as a vector. The choice of representation may depend on various factors, such as the length of the desired vectors and/or the type of data included in routes. In one example, two routes may be considered essentially the same if a distance between vectors representing the two routes is below a predetermined threshold. The cosine of the angle between two vectors may be used to measure the distance (or similarity) between the vectors. For example, if the angle between the two vectors, as determined from the cosine, is smaller than a predetermined threshold, the two routes corresponding to the vectors may be considered essentially the same. Optionally, if the angle is below a second, slightly higher predetermined threshold, the two routes may be considered similar to each other.

Configuration Elements and Changes

In one embodiment, the software systems may include many modules that can be configured to suit an organization's needs. Configuring a system may involve various aspects of a software system, modules belonging to the software system, and/or business processes run on the software system. Optionally, in some embodiments, configuring a system is done, at least in part, using configuration files, setup file, and/or customization code that are read by the system and may be altered by an organization to suit the organization's needs. In one example, configuring a SAP ERP system involves entering, editing, and/or removing values from configuration tables. Optionally, the tables may define various aspects of fields (e.g., name and type) for certain data tables users may access via the ERP system. In another example, an Oracle™ database system is configured using Oracle form personalization, which is a standard feature provided by Oracle™ and supported by Oracle™ to customize the forms. Forms personalization enables changing properties of fields, such as hiding fields, making fields mandatory, creating zoom functionality, and/or dynamic changes of lists of values. In one embodiment, customizations refer to user-generated code, such as "user exit" in SAP, and customization code in Oracle.

In some embodiments, a configuration element is one or more details (e.g., a line in a configuration file, a field name, a function name), which can be used to configure behavior of a software system. In one example, a configuration element may define certain aspects of data structures used by the system (e.g., column names in a table) and/or type of values in a column belonging to a table. In another example, a configuration element may determine behavior of a system, such as defining what functions should be called under certain conditions (e.g., what to do with a printing job).

In one embodiment, a change to a configuration element may be referred to as a "configuration change". Optionally, a configuration change may include one or more actions that involve adding a configuration element, deleting a configuration element, and/or editing a configuration element. Optionally, a configuration change may require running one or more test scenarios in order to verify that the configuration change caused a desired effect and/or in order to verify that the configuration change did not cause an undesired effect.

In one embodiment, a configuration element may have an associated value. For example, a configuration element called "default field width" may have an associated value 20. Optionally, a change to an associated value of a configuration element may be referred to as a "configuration change". Optionally, a configuration change may involve adding an associated value to a configuration element, deleting an associated value from a configuration element, and/or editing an associated value of a configuration element.

In some embodiments, there may be various ways in which configuration elements and/or configuration changes may be identified. Identifying a configuration element enables a software system and/or a user to determine what configuration element is being referred to. Similarly, identifying a configuration change enables the software system and/or a user to determine what configuration element being changed and/or what change is done to an associated value of the configuration element.

In one example, a configuration change is identified by a code, such as a hash code or an identification number. Optionally, the code also identifies an associated value of the configuration element and/or a change to an associated value of the configuration element. In another example, a configuration change and/or a configuration element may be characterized by a new configuration file (e.g., a new setup file for the system). Optionally, a comparison between a new configuration file and a previous configuration file may characterize configuration changes, that involve changes to configuration elements and/or associated values of configuration elements.

In one embodiment, configuration elements and/or configuration changes may be clustered into clusters of similar configuration elements and/or configuration changes. Optionally, clusters of similar configuration elements include configuration elements that deal with the same, or similar, system modules, business processes and/or database tables. Optionally, clusters of similar configuration changes include configuration changes that deal with the same, or similar, configuration elements. Optionally, clusters of similar configuration changes include configuration changes that are associated with similar values.

In one embodiment, configuration elements and/or configuration changes are clustered utilizing text clustering approaches. For example, clustering is performed on configuration files that include the configuration elements and/or configuration changes. Those skilled in the art may identify various text clustering algorithms that may be utilized to cluster configuration elements into clusters of similar configuration elements. Optionally, configuration elements and/or configuration changes may be considered similar if configuration files that include the configuration elements and/or the configuration changes are considered similar (e.g., they belong to a same cluster).

In another embodiment, clustering configuration elements and/or configuration changes may be done based on values associated with the configuration elements. Optionally, clusters of similar configuration elements and/or configuration changes may include same or similar configuration elements and/or configuration changes, which have similar associated values in several ways. In one example, portions of configuration files that include multiple configuration elements and/or configuration changes are converted to vector representation; each vector dimension corresponds to a certain configuration element and the value entered in the vector dimension corresponds to an associated value of the certain configuration element. Those skilled in the art may recognize various algorithmic approaches that may be utilized to cluster vectors representing the portions of the configuration files (e.g., k-means or hierarchical clustering).

Clustering Runs of Test Scenarios

In some embodiments, runs of test scenarios may be clustered. Clustering the runs may involve assigning a run of a test scenario to at most one cluster (e.g., "hard clustering" or partitioning). Alternatively, the clustering may involve assigning a run of a test scenario to one or more clusters. For example, the clustering may be "soft clustering" in which a run of a test scenario may belong to various clusters, possibly with different probabilities or levels of association to each cluster. Optionally, clusters of runs contain runs that are similar to each other.

In one embodiment, runs of test scenarios may be partitioned into clusters based on one or more values from the runs of test scenarios. For example, runs that involve a same start and/or end test step may be placed in the same cluster (e.g., runs that start from the same screen ID and end with an error are placed in the same cluster). In another example, runs that have a certain field (e.g., customer bank account number) are placed in the same cluster.

Clusters of runs of test scenarios may have different characteristics in different embodiments. In one embodiment, a cluster of runs of test scenarios should be of a size that reaches a predetermined threshold. Optionally, the predetermined threshold is greater than one. For example, each cluster should contain at least 3 runs. Optionally, the predetermined threshold is proportional to the number of runs being clustered. For example, each cluster may be required to contain at least 0.1% of the runs of test scenarios being clustered.

Clusters of runs may also be constrained according to the source of the runs belonging to the clusters. In one embodiment, a cluster of runs of test scenarios must include runs of at least a first predetermined number of different users and/or of users belonging to at least a second predetermined number of organizations. Optionally, the first predetermined number is greater than one and/or the second predetermined number is greater than one. In one example, the first predetermined number is 10, and the second predetermined number is 2; thus, each cluster includes at least 10 runs, and not all those runs are associated with the same organization. In another example, the first predetermined number is 5, and the second predetermined number is 5; thus, each cluster needs to contain runs associated with at least 5 organizations.

In one embodiment, ensuring that clusters of runs have certain characteristics, such as a certain size and/or include runs of a certain source, is done by a clustering algorithm that generates the clusters. For example, the clustering algorithm may ensure that each cluster includes runs of test scenarios of at least a predetermined number of users. Alternatively or additionally, ensuring that clusters of runs have certain characteristics may be done after clustering. For example, after clusters are generated, they may be filtered to remove clusters that have a size that is smaller than a predetermined threshold.

In one embodiment, clustering of runs of test scenarios may involve procedures that rely on some runs being similar based on a criterion of similarity. Optionally, a cluster of runs may include similar runs. Optionally, by similar runs it is meant that two runs are similar to each other according to the criterion. Optionally, by similar runs it is meant that at least a certain percentage of the runs belonging to a cluster are similar to each other according to the criterion. For example, a cluster may be considered to include similar runs if 90% of the pairs of runs in the cluster are similar according to the criterion. Optionally, by similar runs it is meant that runs belonging to the cluster are all similar to a representative of the cluster, such as one of the runs belonging to the cluster or an average run of the cluster (e.g., a centroid of the cluster).

The criterion according to which similarity between runs may be established, may have several forms. For example, the criterion for similarity between runs may be that similar runs include at least one of: essentially the same fields, similar combinations of fields, similar execution of transactions, similar user interactions, similar requests, similar test steps, and/or similar calls to procedures. Optionally, similarity between runs of test scenarios may be determined based on properties of their respective test scenarios of which the runs are instantiations; for example, by comparing the test steps used in each test scenario.

In one example, various runs of essentially the same test scenario (e.g., essentially the same testing script) are considered similar. In another example, runs of different test scenarios (e.g., using slightly different testing scripts), may be considered similar if certain similarity criteria are met (e.g., similar fields types or names, similar field values, similar screen content and/or layout, and/or similar return values in the runs). In yet another example, runs of test scenarios are considered similar, if the test scenarios from which they were instantiated are similar (e.g., involve similar screens, similar fields, and/or similar field values).

In one example, at least part of the runs of test scenarios involve software that runs on remote servers such as cloud-based servers. Monitoring a user running a test scenario may involve monitoring the content of the network traffic, such as information exchanged between an input and/or output device of the user and a cloud-based server. In this example, runs of test scenarios may be considered similar if the network traffic associated with them is similar (e.g., it follows a similar exchange sequence, and/or content of the network traffic is similar).

In one embodiment, clustering runs of test scenarios to clusters that include similar runs may be based on counting the number of similar fields used in corresponding screens that are included in the test scenarios; the larger the number of similar fields in the test scenarios, the more similar the runs of the test scenarios are considered to be. Optionally, fields may be considered similar if they include the same type of data. Additionally or alternatively, fields that have the same values are considered similar to each other. In one example, fields that include both the same type of data and the same values are considered more similar to each other than fields that have the same type of data (but different values).

In one embodiment, a type of data of a field is determined according to the context of the field in the screen. For example, if a field is preceded on a screen by the words "amount" or "sum due", the field is considered to be numerical; while if the field is preceded on a screen by the words "address" or "ship to", it is considered to be a string. Additionally or alternatively, the type of data of a field may be determined according to the features of the data structure representing the data. For example, if the field stores data in a variable that holds integers or floating-point values, the type of data is considered to be numerical. However, if the field stores data in an array, or vector of characters, the data type is considered to be a string. Additionally or alternatively, the type of data of a field may be determined according to meta data associated with a screen or database associated with the field. For example, a description of a column, in a database table which is to receive data from a field may be indicative of the type of data. In another example, meta data tags (e.g., XML tags) associated with a screen may indicate the type of data.

In another embodiment, clustering of runs of test scenarios to clusters that include similar runs of test scenarios may be based on similarity between orders of displaying similar fields in corresponding screens. The closer the order of presentation of similar fields in test scenarios, the more similar runs of the test scenarios are considered to be. In one example, test scenarios are represented, at least in part, as a sequence of field types, and/or fields IDs. The similarity between two runs of test scenarios may be determined to be inversely proportional to the number of editing steps that need to be taken to transform one sequence of identifiers to another ("edit distance"); the lower the edit distance between representations of two runs, the more similar they are considered to be (and so are their corresponding runs).

In yet another embodiment, clustering of runs of test scenarios to clusters that include similar runs may be based, at least is part, on similarity between executed procedures that are described in the runs. For example, the larger the overlap in the corresponding sets of procedures performed by each test scenario, the more similar runs of the test scenarios are considered to be. Optionally, the clustering may be further based on the order of the execution of the procedures; the closer the order of execution of procedures in different test scenarios, the more similar runs of the test scenarios are considered to be. In cases in which test scenarios involve execution of essentially the same procedures in essentially the same order, the similarity between runs of the test scenarios may be considered to be high.

In still another embodiment, the clustering of runs of test scenarios to clusters that include similar runs of test scenarios may be based on transactions described as executed in the runs of the test scenarios. For example, test scenarios may be characterized by the individual commands run by the system as part of the test scenario. Runs of test scenarios in which similar commands are executed may be considered similar for the purpose of clustering. Optionally, a cluster of runs that contains runs that have a certain proportion of common transactions executed in all runs in the cluster is considered a cluster of similar runs. For example, if at least 50% of the transactions involved in each run in a cluster appear in all other runs in the cluster, the cluster is considered to be a cluster of similar runs.

Logged activities related to running test scenarios may also be utilized for the purpose of clustering and/or determining similarity between runs of test scenarios. For example, clustering of runs of test scenarios to clusters that include similar runs may be based on one or more of the following logged activities: a list of users who ran the test scenarios, an analysis of access to a database, messages returned from the executed transactions (e.g., valid, warning, or error messages), fields which returned values in the transactions, and/or procedures utilized by the test scenario (e.g., as identified by logs of run time analysis). The clustering may be done according to there being similarity, involving one or more of the aforementioned logged activities, between test scenarios whose runs are assigned to the same cluster. Optionally, logged activities may be represented as feature values that may be put in a vector corresponding to a run. For example, if a certain activity is performed during a run, a vector corresponding to the run has 1 in a certain position, and otherwise there is a 0 in the certain position.

Similarity of runs of test scenarios may be determined, in some embodiments, according to the test scenarios and/or templates from which the runs were instantiated. Optionally, similarity of the test scenarios and/or templates may define similarity of the runs that were instantiated from the test scenarios and/or templates; thus, runs that were instantiated from similar test scenarios and/or templates are placed in the same clusters (e.g., by the clustering module performing the clustering of the runs). Alternatively, similarity of the test scenarios and/or templates may be used as features that assist in determining similarity of runs.

In one embodiment, runs that were instantiated from the same test scenarios and/or the same templates may be considered similar. Optionally, two test scenarios and/or two templates are considered the same if they involve execution of the same test steps, screens, and/or transactions. In one embodiment, two test steps are considered the same if they perform the same exact task and include the same exact associated data, while in another embodiment the two test steps are considered the same if they perform the same task but possibly involving different associated data. For example, a first test step that involves entering a new product that is a screwdriver (with details relevant to a screwdriver) may be considered in the latter embodiment as being the same as a second test step that involves entering a new product that is a hammer (with details relevant to a hammer); however, according to the former embodiment, the first and second test steps may not be the same. Similarly, screens that include field names and field values may be considered the same in one embodiment if the field names and the field values are the same; in another embodiment, the screens may be considered the same if the field names are the same. The same logic may also be applied to transactions; in some examples transactions may be considered the same if they are completely identical, while other transactions may be considered similar if they include some of the same and/or similar elements (e.g., the transactions involve similar screens).

In another embodiment, similarity of test scenarios and/or templates is determined by comparing and/or counting similar elements in the test scenarios and/or templates. If the number and/or proportion of the similar elements reaches a predetermined threshold, then runs instantiated from the test scenarios and/or templates may be considered similar and placed by clustering in the same cluster of runs. For example, if more than 50% of the screens included in two templates are similar, then runs instantiated from the two templates may be placed by clustering in the same cluster.

In yet another embodiment, test scenarios and/or templates from which runs were instantiated may be utilized to generate feature values, which are used to determine similarity of the runs to each other. For example, a vector of features representing a run may include values extracted from a template and/or test scenario from which the run was instantiated.

Clustering of runs of test scenarios to clusters of similar runs may be based on data associated with the runs. Such data may include data describing conditions under which a run was executed. For example, the data may describe aspects of the system (e.g., data involving modules, hardware, and/or software versions). In another example, such data may pertain to a test runner, such as the role (or assumed role) of the tester in an organization, level of skill of the tester, and/or permissions granted to the tester.

In some embodiments, clustering of runs of test scenarios to clusters of similar runs is done, at least in part, according to descriptions related to the systems on which the test scenarios were run. For example, such descriptions may include configuration elements (e.g., configuration files, customization code and/or setup files). Additionally or alternatively, the descriptions may include configuration changes (e.g., addition, deletion, and/or modifications) to the configuration elements. Thus, for example, runs of test scenarios concerning modules with similar configuration files (e.g., the customization files indicate similar default procedures and/or database accesses) may be placed in the same cluster. In another example, runs of test scenarios executed as a response to similar configuration changes (e.g., as determined by the original and/or changed values involved in the configuration changes), may be placed in the same cluster based on their similar configuration changes.

In some embodiments, runs of test scenarios may be represented as vectors of features that may be converted to numerical values. For example, certain dimensions in the feature vectors may correspond to the presence or absence of certain fields, procedures, test steps, and/or transactions in a test scenario (e.g., a value of '1' is given to a feature if a field has a certain value in the test scenario, and '0' otherwise. Alternatively, a value of '1' is given to a certain feature if a certain procedure is called in the test scenario, and '0' otherwise). In another example, certain dimension in the feature vectors contain values of a certain field from a run (e.g., time, data, or price), or are derived from processing one or more field values (e.g., averaging the delivery time from multiple entries of individual delivery times entered in a screen). In yet another example, certain values in a feature vector are assigned numerical values according to categories to which values from the runs belong. For example, a sale may be categorized as "domestic" or "foreign", and accordingly be given a value of "1" or "2" in the feature vector.

Feature vector representations may be utilized in order to compute a degree of similarity between feature vectors of runs of test scenarios. For example, in cases where the feature vectors contain numerical values (or can be converted to numerical values), the distance similarity between vectors representing test scenarios may be computed using one or more of the following established distance metrics: Euclidean distance of various norms, vector dot product, cosine of angle between vectors, Manhattan distance, Mahalanobis distance, Pearson correlation, and Kullback-Leibler divergence.

In one embodiment, a cluster of similar runs includes runs that are represented by similar vectors. Optionally, similar vectors may be characterized in various ways. In one example, similar vectors are vectors whose average pairwise similarity is above a predetermined threshold (e.g., the threshold may be 0.5). Optionally, the average pairwise similarity is determined by computing the average of the dot product of each pair of vectors. In another example, similar vectors are vectors that are all similar to a certain representative vector; e.g., the vectors all within a sphere of a certain Euclidean distance from the representative.

Those skilled in the art may recognize that various clustering algorithms and/or approaches may be used to cluster runs of test scenarios into clusters that include similar runs of test scenarios. For example, the clustering may be done using hierarchical clustering approaches (e.g., bottom-up or top-down approaches) or using partition-based approached (e.g., k-mean algorithms). In addition, some of the test scenarios may have assigned clusters while others may not. In such a case, a semi-supervised clustering approach may be used such as an Expectation-Maximization (EM) algorithm.

In one embodiment, the clustering of the runs of test scenarios to clusters that include similar runs may be done utilizing a classifier that is trained to assign test scenarios to predetermined classes. Optionally, the classifier is trained on labeled training data that includes training data that includes representations of runs of test scenarios (e.g., feature vectors) and labels corresponding to clusters to which the runs are assigned. If the labels in the training data are assigned according to some (possibly arbitrary) notion of similarity between test scenarios, clusters of test scenarios that have the same label assigned by the classifier are likely to contain runs that are similar according to the notion of similarity.

Optionally, runs of test scenarios are labeled according to the module they involve (e.g., "sales", "human resources", "manufacturing"), the type of activities involved in the scenario (e.g., "accessing database", "data entering", "report generating"), fields in the test scenario (e.g., "customer ID", "part number"), properties of the test scenario (e.g., "fast", "many steps", "expensive", "includes private data"), and/or results of a run of the test scenario (e.g., "ok", "error", "access denied—permissions"). Optionally, labels may be constructed from multiple attributes. For example, a run of a test scenario may be labeled as "involve sales, no private data, access corporate database".

Optionally, labels assigned to runs of test scenarios may be generated and/or assigned manually (e.g., by a tester running a test), and/or automatically, e.g., by a procedure that analyzes a test scenario to detect attributes describing it (e.g., what modules and/or procedures it involves).

Those skilled in the art may recognize that there are many algorithms, and/or machine learning-based approaches, that may be used to train a classifier of runs of test scenarios using labeled training data. For example, some examples of the algorithms that may be used include logistic regression, decision trees, support vector machines, and neural network classifiers.

In some embodiments, clusters of runs of test scenarios may be assigned a cohesion rank that describes how close to each other are runs belonging to the cluster. A cohesion rank of a cluster may describe various aspects related to the closeness of runs of test scenarios belonging to a cluster. In one example, similarity of runs of test scenarios is related to the fields included in the screens of the test scenarios; some of the fields may be common to the screens involved in runs belonging to the cluster, and some may not. The cohesion rank may be proportional to the number of fields that are common in the runs belonging to the cluster (e.g., they belong to at least 50% of the runs in the cluster). The cohesion rank can be between two runs of test scenarios or between groups of runs of test scenarios. Optionally, the cohesion rank may be expressed via cluster metrics such as average distance from the cluster centroid or the ratio between the average radius of a cluster (intra-cluster distance) and the average distance between clusters (inter-cluster distance).

Clusters generated in the embodiments (e.g., clusters of runs of similar test scenarios) may be filtered in various ways. Optionally, the filtering may be done in order to reduce the number of clusters that need to be considered and/or retain clusters with a certain desirable property. Optionally, a test scenario template generated from a filtered cluster and/or representing a filtered cluster is not suggested to a user. Alternatively or additionally, a filtered cluster is not utilized for generating a test scenario template and/or does not have a test scenario template to represent it. Optionally, clusters are filtered according to their size. For example, clusters of runs of test scenarios that contain less than a predetermined number of runs are filtered. Optionally, clusters are filtered according to the number of their associations. For example, runs of test scenarios in a cluster may be associated with certain organizations (e.g., each run may be associated with an organization). Clusters containing runs that are associated with too few different organizations may be considered too homogenous and filtered.

Test Scenario Templates

A test scenario template may include various test steps that need to be performed by a user in order to test certain aspects of a system being tested. Optionally, in some embodiments, a test scenario template may be lacking one or more values that need to be provided in order to run a test scenario based on the test scenario template. In such a case, a user running a test scenario based on the template may be required to enter the one or more values that need to be provided, in order to complete the template of the test scenario; alternatively, the one or more values and be calculated and/or guessed. In one example, a test scenario template may describe a test scenario in which an order process is completed; the template may be lacking a customer name and product ID, and in order to run an instantiation of the template, a user may be required to enter the lacking details. In another example, a template may be of a test scenario in which rush shipping is performed; a screen presented to the user may already have the rush shipping box checked, but the user may still need to add details such the client account number and shipping address.

In one embodiment, a template may include certain values from which a user may be required to choose in order to run a test scenario instantiated from the template. For example, a template may have various values for a discount (e.g., 10%, 20%, or 50%); a user needs to choose from in order to complete a transaction that is part of the template. Optionally, the values the user may need to choose from are derived from one or more runs of test scenarios that were used to generate the template. For example, the aforementioned values of the discount are the most popular values found to be used in runs of test scenarios from which the template was generated.

In some embodiments, one or more runs of test scenarios may be used in order to generate a test scenario template to represent them. Optionally, the test scenario template is generated by a template generator module. In one example, the runs of test scenarios may belong to a cluster. Optionally, the test scenario template may identify, for its corresponding cluster, one or more transactions used by test scenarios belonging to the cluster. Additionally or alternatively, the test scenario template may identify a way of using transactions that are part of the test scenarios whose runs belong to the cluster. For example, a template may define the order of programs that are to be called, the type of actions that are to be taken by a user (e.g., what fields to fill, what buttons to push), and/or provide default values to at least some of the fields (e.g., enter default values to some fields that appear on screens that are part of test scenarios generated from the template). Additionally or alternatively, a test scenario template may identify one or more possible values that may be used to run a transaction identified by the template.

It is to be noted that phrases such as "identifies a transaction" involves any type of transaction identification, such as a transaction identification number, a name of a transaction, a description of a transaction, a screenshot of a transaction, computer code of a transaction, and/or any other method that enables a human and/or a computer to link between a possible value and a transaction. Additionally, identifying a transaction may involve noting a transaction identification. In one example, noting a transaction identification involves storing the transaction identification; for example, a template may store transaction identification numbers that are to be executed when running an instantiation of the template. In another example, noting a transaction identification involves providing the transaction identification. For example, upon a query, scanning a template may generate and/or transmit names of transactions that are stored in it.

Generating the template may involve utilizing information from a plurality of runs of test scenarios. For example, one or more test steps, commands, and/or values may be copied from at least one of the plurality of runs of the test scenarios and placed in the template. Additionally or alternatively, information contained in at least some of the plurality of runs may be analyzed in order to determine certain test steps, commands, and/or values are to be used in the template. Note that not all information in the plurality of run of the test scenario needs to be utilized to generate the test scenario template. For example, a test scenario template may include a proper subset of test steps included in certain runs. In another example, certain runs, such as certain runs in a cluster, may be disregarded when generating a template based on other runs in the same cluster.

In some embodiments, template generation may be based on information obtained from one or more test scenarios. Optionally, instantiations of the one or more test scenarios are runs of test scenarios obtained and/or identified from activity data of users. In one example, a test scenario may include a script comprising test steps, and one or more test steps from the script are included in the template. Note that the script may be one various types of media; for example, a hard copy document (e.g., paper), an electronic document (e.g., a Microsoft Word™ or a PDF document), and/or a list of computer commands (e.g., a script for an automatically run test scenario). In another example, a test scenario may include certain values that may be altered by a user running instantiations of the test scenario (e.g., the certain values may be default values). In this example, to generate the template it may be desirable to utilize a certain value from a test scenario, rather than a user-provided value from a run that is an instantiation of the test scenario.

A test scenario template may be generated based on data coming from several sources. In one embodiment, a template is based on automatic test scenarios (e.g., scripts run automatically by a program without any essential human intervention). Additionally, the template may also be based on the runs of the same test scenario. Thus, certain values in the template may come from the test scenarios, while other values may come from the runs. In another example, a template may be based on runs coming from different organizations. The template may contain certain screens coming from a first organization (e.g., as they appeared in runs associated with the first organization), while other screens in the template may come from runs associated with a second organization.

In one embodiment, a test scenario template is generated from a first run of a test scenario run by a first user and a second run of a test scenario run by a second user belonging to a second organization. Optionally, the first and second runs were obtained from monitoring of the first and second users, respectively. Additionally, the first organization may be different from the second organization and the first user is not the second user. The test scenario template generated from the first and second run identifies a transaction used in the first and second runs and one or more possible values for running the transaction. Optionally, additional runs of test scenarios, besides the first and second runs, are used to generate the test scenario template.

In one embodiment, at least one of the possible values for running a transaction in a template generated from first and second runs may be derived from values obtained from the first and/or second runs. Optionally, the at least one of the possible values for running the transaction does not appear in each of the first and second runs. For example, the at least one of the possible values is an average of a first value from the first run, and a second value form the second run, and the first value does not equal the second value. Optionally, the test scenario template includes a combination of the possible values that may be used to run the test scenario template, and the combination does not appear in any of the first and second runs. For example, a combination of possible values involves fields $f_1$ and $f_2$; the first run has values $v_1$ and $u_1$ for the fields $f_1$ and $f_2$, respectively, and the second run has values $v_2$ and $u_2$ for the fields $f_1$ and $f_2$, respectively. In addition, $v_1$ does not equal $v_2$ and $u_1$ does not equal $u_2$. In this example, if the test scenario template has a value $v_1$ for $f_1$ and $u_2$ for $f_2$, then it contains a combination of possible values that does not appear in any of the first and second runs.

In one embodiment, the first and second runs upon which a template is based, may each be manual, semi-automatic, or automatic runs of test scenarios. In one example, a test scenario template is generated from a first run of a first test scenario which is a manual test scenario and a second run of a second test scenario which is an automatic test scenario. In another example, a test scenario template is generated from a first run of a first test scenario and a second run of a second test scenario, and both the first and second runs are automatic.

In another embodiment, the first test scenario and second test scenario are the same test scenario. Thus, the first run and the second run are instantiations of the same test scenario. In this case, despite being runs of the same test scenario, the first and second runs may be different (e.g., due to different inputs provided by a user during their running). Alternatively, the first test scenario and second test scenario may be different test scenarios. Thus, the first run and the second run are runs of different test scenarios; however, the first and second runs may be similar due to similarities (despite being different) between the first and second test scenarios and/or similarities in inputs provided by the user while running the first and second runs).

In one embodiment, generating a test scenario template involves receiving multiple runs (e.g., runs belonging to a cluster of similar runs), and selecting at least a first run and a second run, from among the multiple runs, upon which the template is to be based. Optionally, the first and second runs are selected such that they belong are runs of different users and/or runs of users belonging to different organizations. Optionally, the first and second runs are runs that exhibit, on average a high similarity to the multiple runs (e.g., they are similar to a cluster centroid). Optionally, the first and second runs are selected such that other of multiple runs have a similarity to either the first run or the second run that reaches a predetermined threshold. Optionally, the first and second runs are selected according to a profile, such as a profile of a certain user. Optionally, the profile indicates transactions and/or values typically utilized by the certain user, and the first and second runs that are selected involve transactions and/or values that appear in the profile.

In one embodiment, generating a test scenario template from a cluster of runs of test scenarios involves identifying a representative run of a test scenario for the cluster, and using the representative run of a test scenario as basis for the at least one template.

In one embodiment, generating a test scenario template from a run of a test scenario may involve utilizing information from the run of the test scenario. For example, one or more test steps, commands, and/or values may be copied from the run and placed in the template. Additionally or alternatively, information contained in the run may be analyzed in order to determine certain test steps, commands, and/or values are to be used in the template. Note that not all information in the run of the test scenario needs to be utilized to generate the test scenario template. For example, the template may include a proper subset of test steps included in the run of the test scenario. Optionally, certain information in the run which may be deemed proprietary is not utilized for the template. Additionally or alternatively, certain information in the run which may be deemed proprietary is removed from the template.

In another embodiment, generating a test scenario template from runs of test scenarios (e.g., the runs belong to a cluster of similar runs of test scenarios), may involve utilizing values of a field, as they appear in runs, in order to set the value of the field in the test scenario template.

In one embodiment, the value for the field in the test scenario template is selected from the values of the field in the runs of test scenarios in the cluster. For example, the value of the field in the template is set according to the value of the field in a randomly selected run of a test scenario from the cluster.

In one embodiment, the value for the field in the test scenario template is generated by a function with one or more parameters that are set according to the values of the field in the runs of test scenarios in the cluster. Optionally, the value generated by the function is not a value found in any of the runs belonging to the cluster. For example, in order to fill the field "age" in the template, a distribution of the values of "age" in runs in the cluster may be learned, and then the value in the template may be set according to the expectation of the learned distribution or randomly drawn according to the distribution. In this example, the resulting value of "age" may not be an actual value that appears in any of the runs belonging to the cluster.

Test scenario templates may be suggested to a user so that the user may run an instantiation of the templates on a system to which the user belongs and/or is associated with. Optionally, a template may be generated from one or more runs of test scenarios associated with various organizations to which the user does not belong.

In some embodiments, a user is suggested to run a test scenario template by presenting the user with a suggestion on a user interface. For example, the user interface may be a screen (e.g., monitor, image projected on a screen, and/or augmented/virtual reality display). In another example, the user interface may involve a speaker. Optionally, the user may interact with a system via the user interface in various ways; for example, touch (e.g., via a touch screen), typing (e.g., on a physical and/or virtual keyboard), a hand-operated control device (e.g., a mouse), and/or voice commands. Optionally, the user is given an opportunity to modify via the user interface, data related to the instantiation and presented on the user interface; for example, the user may modify default values, set according to the template, and presented on a screen that is presenting while running an instantiation of the template. Optionally, the user interface may initiate an instantiation of a test scenario template; for example, the user interface may present a first screen of the test scenario template and prompt the user to take a certain action to advance execution of the template.

In one embodiment, a user is recorded while running a certain test scenario. If it is identified that the certain test scenario is similar to a test scenario template (e.g., the certain test scenario involves similar test steps, transactions, and/or values as those involved in the template), it may be suggested to the user to run an instantiation of the test scenario template. Optionally, a suggestion to the user to run an instantiation of the template is made via a user interface.

In another embodiment, a profile of a user is utilized to suggest to the user to run a test scenario template appropriate to the user based on information included in the profile. In one example, the profile may include various information regarding the user and/or an organization to which the user belongs, such as information regarding modules, business processes, and/or transaction utilized by the user and/or organization. In another example, the profile may include runs of the user and/or users belonging to a certain organization, and/or data derived from the runs. In addition to the profile, and/or instead of it, the suggestion of a template to the user may be done according to other factors such as coverage of templates, importance of templates, ranking of templates, and/or connectivity factors of templates, as described in more detail below.

Coverage

In order to validate that certain system elements operate correctly after installation, customization, a change, and/or an upgrade is done to the system—it is often the case that many test scenarios need to be run. In order to validate the system's performance, it is desirable that the test scenarios that are run should cover many elements that may be related to, and/or affected by, the installation, customization, change, and/or upgrade. For example, the elements may include various transactions that may exhibit undesired behavior due to the certain configuration change and/or upgrade; each executed test scenario may be able to be used to test a subset of the transactions that are likely to be affected by the change, and/or update, in order to determine if unwanted system behavior occurs that involves one or more transactions. Therefore, the coverage offered by a set of test scenarios (or test scenario templates), such as which modules, business processes, and/or transactions are evaluated by running a set of test scenarios, becomes an important consideration when selecting which test scenarios to run. Ideally, it would be desirable to obtain as large coverage as possible with test scenarios, however, often restrictions stemming from limited resources for running test scenarios have also to be taken into account.

In one embodiment, coverage refers to a percent of business processes, used by an organization, that are sufficiently tested by test scenarios in relation to the total number of business processes used by an organization or a certain user. For example, if 40% of the business processes run by users of an organization are sufficiently tested by certain test scenarios, then the coverage of the certain test scenarios is 40%. In some cases in order for a module, business process, and/or transaction to be sufficiently tested, more than one aspect of the module, business process, and/or organization needs to be tested. This may involve running multiple tests in order to cover the more than one aspect. For example, different combinations of input data for the same screen need to be provided in order to test various aspects of a certain business process.

In one embodiment, a required coverage for a certain user that runs test scenarios, is received and utilized for suggesting test scenario templates for the user. For example, the required coverage may list certain transactions that need to be evaluated with test scenarios run by the user, and optionally the number of test scenarios that need to be run to evaluate at least some of the transactions. Alternatively or additionally, the required coverage may indicate what percentage of a system's transactions need to be evaluated by the test scenarios. In another example, the required coverage may indicate which business processes, screens, and/or specific fields need to be evaluated by running test scenario.

In one embodiment, achieving a required coverage is done by evaluating a large number of test scenario templates and estimating coverage achieved by individual templates and/or subsets of templates. Following the evaluation, a subset of templates that includes at least one template is suggested to the user in order to achieve the required coverage. Optionally, the suggested subset that includes at least one template is a subset with an essentially minimal number of templates and/or involves performing an essentially minimal number of test steps. It is to be noted that by an "essentially minimal" number it is meant a number close to the absolute minimal possible, for example up to 10% more than the absolute minimum. In some cases, the absolute minimal number of templates may be determined by an exhaustive evaluation of all possible subsets of templates; however, this may prove intractable if a large number of templates are involved.

In one embodiment, calculating the required coverage for a certain user is based on a usage information of a certain user. For example, by analyzing the usage information a list may be prepared of certain modules, business processes, and/or transactions the user frequently utilizes. This list can then be used to guide a search for a certain subset of test scenario templates that tests aspects of items on the list which need to be tested.

Finding a minimal sized subset of template obtaining a desired coverage need not require exhaustive search in every case. Those skilled in the art may recognize that there are structured methods for evaluating a search space of subsets of templates such as branch-and-bound approaches, or A* searches that enable finding the essentially minimal subset without necessarily evaluating all subsets of templates. In addition heuristic search methods may be used, such as simulated annealing, genetic algorithms, and/or random walks in order to quickly find subsets with a small number of templates (but not necessarily minimal). Additionally, optimization algorithms that involve constraint satisfaction may be used to efficiently find an essentially minimal subset.

In one embodiment, a goal of a search for a subset of templates that achieves a certain coverage is to find a subset of templates, which involves a minimal amount of testing time on the user's part. Achieving the required coverage for the certain user involving the shortest testing time for the user may be done by estimating time to achieve a required coverage for the certain user by many templates (e.g., in a search performed in the space of possible subsets of templates). And after evaluating the time it takes to run each of the many templates and/or subsets of templates, suggesting the certain use utilize a subset that includes at least one of the templates, that both achieves the required coverage and requires an essentially minimal time to complete. In this case, the suggested templates are likely to be templates relevant to scenarios that are expected to be used by the certain user, and are likely to be spread to approximately achieve a uniform coverage of the scenarios with the suggested templates.

In some cases, it is useful to refer to a coverage of a test scenario template with respect to a test scenario. In one embodiment, a template is said to cover a certain test scenario if it involves essentially the same test steps as the test scenario. Additionally or alternatively, coverage of a template with respects to a test scenario may be the percentage of test steps of the test scenario that are included in the template. Similarly coverage of a subset of templates with respect to a test scenario may refer to the test steps in the test scenario that are included in at least one of the templates in the subset.

Importance of a test scenario for a certain user may also be an objective that guides the suggestion of a template to the certain user. In one embodiment, test scenario templates that cover a test scenario are estimated to be important are suggested to the certain user before other templates that are estimated to be less important.

There are various ways in which importance of a test scenario may be evaluated. In one example, the importance of a certain test scenario is determined by frequency in which the certain test scenario is used relative to frequency in which other test scenarios are used. Thus, a test scenario often run by the certain user may be deemed significantly more important than a test scenario rarely run by the certain user. In another example, importance of a certain test scenario is determined by characteristics of users that run the certain test scenario, compared to characteristics of users that run other test scenarios. For instance, if a certain test scenario is run primarily by users that hold high positions in an organization's hierarchy, it is likely that the certain test scenario is more important than another test scenario that is used primarily by users on the lower rungs of the organization's hierarchy. In yet another example, importance of a certain test scenario is determined by a financial value associated with the certain test scenario compared to a financial value associated with other test scenarios. For example, a test scenario that involves retaining an unsatisfied customer may be given a high financial value for the organization compared to another transaction which involves sending customers a notice that their order is still pending.

Profile of a User

A profile of a user may include data related to the user, an organization to which the user belongs, and/or activity of the user on a software systems, such as software systems associated with the organization. Optionally, at least some of the data in a profile may be considered proprietary data. Optionally, the proprietary data may identify details regarding the user and/or an organization related to the profile, such as an organization to which the user belongs. In one example, a profile may include proprietary data about the user (e.g., age, address, languages, skills), and/or proprietary data related to a role of the user in the organization (e.g., job title, placement of user in organizational chart, and/or permissions and/or privileges of the user). In another example, the profile may include proprietary data related to the organization to which the user belongs (e.g., field of operation, name and sizes of departments, products and/or services provided by the organization, permissions and/or accounts of the organization, and/or customers and/or suppliers of the organization). In yet another example, proprietary data included in a profile of a user may be indicative of activity of the user. In this example, the activity may have been previously observed and/or recorded (e.g., by monitoring of the user). Additionally or alternatively, the activity may be predicted based on characteristics of an organization to which the user belongs, the position the user holds in the organization, and/or other attributes of the user (e.g., permissions and/or accounts of the user).

In one embodiment, a profile of a user includes data that is indicative of test scenarios relevant to the user and/or templates of test scenarios relevant to the user. For example, the profile may include attributes such as modules used by the user, transactions used by the user (e.g., identifiers of transactions and the number of times they were executed), and/or characteristics derived from activity of the user (e.g., accesses to databases, quantities of network data generated, reports generated by the user). Optionally, a profile of a user may include runs of test scenarios of the user, and/or results of a summary and/or analysis of runs of test scenarios of the user. For example, the profile may include a list of the transactions that are executed often in runs of test scenarios of the user. Optionally, a profile of a user may include information indicative of test scenario templates utilized by a user (e.g., templates which the user ran instantiations of).

A profile of a user may be used in order to suggest to the user to utilize a certain test scenario template. Optionally, the template may be selected from among one or more test scenario templates generated from clusters of runs of test scenarios. For example, given a profile that indicates that a user performs many transactions involving database updates, the system may recommend for the user a template generated from a cluster that contains runs of test scenarios that involve database updates. In another example, if the profile of a user contains samples of runs of test scenario run by the user, the system may suggest to the user to use a template generated from a cluster that contains test scenarios that are similar to a test scenario from which a run in the profile was instantiated. In yet another example, a profile includes state information regarding an organization to which a user belongs, such as the time zone and location of a certain site. This information may be used to suggest a certain template for a user testing a software system at the site. For example, a template that involves a report of a vacation of a user in advance may be relevant to an organization site located in France, but not for a site in the US (where such a practice may not be typically required).

In one embodiment, a profile of a user includes permissions of a user. For example, if a profile indicates that a user has permission to approve vacations, the user may be suggested to run a test scenario instantiated from a template that includes such a task. However, if the user does not have such a permission, then the certain template is irrelevant for the user. In another example, a profile describes a position of the user in the organization hierarchy. In this example, a first user may belong to the marketing department, and thus has permission to enter a new potential client in to the system. A second user may belong to the sales department, and thus can send an offer to a client. Thus, based on the profiles of the users, the system may suggest relevant templates for the users: to the first user a template that involves entering client data, and to the second user a template that involves making an offer to a client, and not vice versa.

In some embodiments, a profile may belong to an organization. For example, it may describe a generic user belonging to the organization. Optionally, a profile of an organization may be utilized to perform initial filtering of test scenario templates for users belonging to the organization. For example, according to a profile of an organization, the organization may not be authorized to run a test scenario instantiated from a certain template (e.g., due to lack of permission). This may make the template irrelevant for each and every user belonging to the organization. However, if the organization is authorized to run an instantiation of the test scenario template, according to the profile of the organization, then a profile of an individual user belonging to the organization may need to be checked in order to determine if the template is relevant to the individual user (e.g., to check whether the user has permission to run a test scenario instantiated from the template). In another example, a profile may indicate a method in which the organization conducts business. For instance, the profile may indicate a policy of making payments for goods. Thus, if the profile indicates that the organization always pays after receiving goods, a template that describes advanced payment for goods is not relevant for any user in that organization.

In one embodiment, a profile of a user may include usage data of an organization to which a user belongs. For example, the profile may describe which modules are relevant to organization. Based on the profile, a user will be suggested templates that are relevant to the organization. Similarly, the profile may describe actions that users belonging to the organization may have permission to perform. For example, if users of an organization are not authorized to access a certain database, a user belonging to the organization will not be provided with a template that includes an access to the certain database.

In some embodiments, a profile of a user and/or an organization may represent usage of transactions by the user and/or users belonging to the organization. Optionally, a profile that represents usage of transactions may be represented in various ways. The profile may include a list of runs of test scenarios, clusters of runs, and/or transactions utilized by the user. Optionally, the usage data may be represented as a vector in which each dimension may correspond to a certain transaction, cluster of runs, and/or template. In one example, if a user utilized a transaction, a value of the vector in a corresponding dimension is 1, otherwise it is 0. In another example, a value of a dimension in the vector that corresponds to a certain cluster of runs is set according to the number of runs in the cluster that were run by the user. Thus, the more the user used transactions with corresponding runs in the certain cluster, the higher the corresponding value in the vector.

Having a vector representation for at least some of the values in a profile makes it easier, in some embodiments, to compare between profiles (e.g., to find similar vectors representing similar profiles of users). Additionally, vector representation of profiles may make it easier to perform mathematical operations, such as vector dot-product or matrix factorization.

A profile of a user may be utilized to customize a test scenario template for the user. For example, by filtering the test scenario template in order for it to be more appropriate for the user. In one embodiment, a profile of the user may be used to determine which test steps, from among the test steps described in a test scenario template, are relevant for the user, and optionally remove test steps that are irrelevant. For example, a profile of the user may indicate that the user does not confirm shipments. A test scenario template, suggested to the user may include several test steps that culminate with a test step involving confirming shipment. In such a case, the last test step may be removed in order to make the test scenario template more appropriate for the user. In one example, a template may include values related to international shipping; however, if the profile of the user indicates that the user runs transactions that only involve domestic shipping, certain values concerning international aspects of the transactions may be removed from the template (e.g., destination country, currency conversion rates). In another example, a template that includes a transaction that is part of an employee evaluation process may include values related managerial assessment of the employee. If the profile of the user indicates that the user is not a manager, then those details may be irrelevant for the user. In this case, the user may receive a template that only includes transactions in which self assessment of the employee are performed. In another embodiment, a profile of the user may be used to determine which values utilized in a test scenario template may be appropriate for the user. Optionally, values deemed irrelevant to the user may be removed from the test scenario template suggested to the user. Optionally, the user may be requested to provide relevant values instead of the removed irrelevant values. For example, a profile of a user may indicate that the user deals exclusively with domestic customers having domestic addresses. However, a test scenario template may include default values that correspond to foreign addresses. In such a case, the foreign addresses may be removed, and the user may be requested to provide examples of domestic addresses.

In one embodiment, a profile of a certain user may be indicative of transactions run by the certain user, and/or clusters containing runs of test scenarios run by the certain user that use these transactions. Thus, the profile is indicative of a usage pattern of the user (actual usage and/or expected usage). Optionally, in order to suggest additional test scenarios, test scenario templates, and/or clusters for the user, collaborative filtering methods, which rely on usage patterns of other users, may be used.

Collaborative filtering is an algorithmic approach generally used for making automatic predictions (filtering) about the interests of a user by collecting preferences or taste information from many users (collaborating). For example, by detecting similarities between the profile of the certain user and profiles other users, it may be possible to suggest to the certain user a template that was utilized by the other users, but has not yet been utilized by the certain user. The underlying assumption is that since the certain user and the other users utilized some of the same templates (as evident from the similarity of their respective profiles), it is likely that a template that was utilized by the other users may be useful for the certain user.

There are many algorithmic collaborative filtering approaches that may be utilized by those skilled in the art to make recommendations for a user based on similarities of a profile of a certain user to profiles of other users. For example, memory-based methods may be used to select a profile similar to the profile of the certain user, such as using nearest-neighbor searches. In another example, model based algorithms may rely on the profiles of the other users to generate a model of test scenarios, templates, and/or clusters suitable for the certain user. The model generation may utilize many algorithmic approaches such as Bayesian networks, latent semantic models, singular value decomposition (and/or other forms of matrix factorization), and/or clustering. In still another example, a combination of the memory-based and the model-based collaborative filtering algorithms may be used. In some cases, a hybrid approach that combines memory-based and model-based approaches may help overcome shortcomings of the individual approaches.

In one embodiment, a first profile of a first user is considered similar to a second profile of a second user if the first and second profiles indicate that both profiles have a certain number of transactions, clusters, and/or templates in common, and the certain number reaches a predetermined threshold. Additionally or alternatively, the first and second profile may be considered similar if the first and second profiles have a certain proportion of transactions, clusters, and/or templates in common, and the certain proportion reaches a predetermined threshold.

In another embodiment, a first profile of a first user is considered similar to a second profile of a second user if a similarity function applied to vector representations of the first and the second profiles indicates that the similarity between the vectors reaches a predetermined threshold. For example, the similarity function may compute the angle (dot product) between the vectors, and if the cosine of the angle is larger than a certain predetermined threshold, the profiles may be considered similar. In another example, the Pearson correlation may be used to determine the similarity of two vectors. In yet another example, similarity between binary vectors representing profiles may be determined according to the Hamming distance of the vectors (e.g., if the hamming distance is below a predetermined threshold, the profiles are considered similar).

In one embodiment, profiles utilized by a collaborative filtering algorithm to suggest templates for a certain user to utilize come from users belonging to organizations that are different from an organization to which the certain user belongs. Often, this can help suggest to the certain user test scenario templates that may be useful for the certain user, but are however unknown or not typically utilized within the organization of the certain user. This may help increase the scope, coverage, and/or diversity of aspects that are tested by runs of test scenarios of the user, which can increase the efficiency of test scenarios, possibly reducing the number of test scenarios that need to be run.

Cleaning Proprietary Data

In one embodiment, a test scenario template generated from one or more runs of test scenarios does not include proprietary data captured during the stage of monitoring users that ran the test scenarios. Optionally, the one or more runs of test scenarios belong to a cluster and the test scenario template is generated as a representative of the cluster.

In one embodiment, determination of whether certain data, which appears in a run of a test scenario and/or is obtained from processing data from the run, is proprietary data is based on the repetitiveness of the data in runs of test scenarios. For example, if a certain value appears in only a small proportion of the runs, in runs of a small number of users, and/or runs associated with a small number of organizations, the certain value may be considered proprietary. Conversely, if a certain value is the same in many runs, or in runs of at least a certain proportion and/or number of the users, and/or is associated with at least a certain proportion and/or number of organizations, that value may be considered to be non-proprietary. Optionally, a predetermined proportion is used as a threshold to determine if a certain value is proprietary or not. For example, if a number of different users which ran runs of test scenarios that included the certain value is less than the predetermined threshold, the value is considered proprietary for those users who had runs that included the value. Otherwise, it may be considered non-proprietary (since many users had the value in one of their runs). It is to be noted, that "predetermined" refers to both a fixed value known a priori (e.g., a threshold of 10 users) and/or a value derived from known logic (e.g., 10% of the users).

In one embodiment, data for which one or more of the following is true may be considered proprietary data associated with an organization and/or proprietary data belonging to the organization: the data describes an aspect of the organization and/or a user belonging to the organization; the data appears in a database of the organization; the data appears in a run of a test scenario associated with the organization and/or is derived from the run; and/or the data is generated by a software system associated with the organization. For example, any data on a server belonging to an organization may be considered proprietary data associated with the organization. In another example, any data derived from analysis of runs of test scenarios associated with an organization may be considered proprietary data of the organization. Additionally or alternatively, data for which one or more of the following is true may be considered proprietary data of user and/or proprietary data belonging to the user: the data describes an aspect of a user; the data describes an organization to which the user belongs; the data appears in a database of the user; and/or the data appears in a run of a test scenario run by the user.

It is to be noted that as used herein, a phrase like "proprietary data" may refer to proprietary data of an organization and/or proprietary data of a user. Additionally, phrases like "proprietary values" and "proprietary data" may be used interchangeably in this disclosure.

In one example, proprietary values are removed from a test scenario template generated from a certain cluster (i.e., one or more runs belonging to the certain cluster were utilized to generate the template). Optionally, the proprietary values are removed by a data cleaner module that operates on the generated template. Additionally or alternatively, removal of proprietary data may be done by other modules belonging to the system, such as a template generator, a customization module, a ranking module, and/or a user interface. Optionally, removing the proprietary values involves selecting a value from the template, and removing the selected value from the template if the selected value appears in less than a first predetermined number of runs of test scenarios in the certain cluster. Additionally or alternatively, the selected value may be removed if it appears in runs belonging to the certain cluster that are associated with less than a second predetermined number of different organizations. In this example, both the first predetermined number and the second predetermined number are greater than one. Optionally, the first predetermined number and/or the second predetermined number are proportional to the number of user with runs belonging to the certain cluster and/or the number of organizations associated with runs belonging to the certain cluster. For example, the first predetermined number may be set to be the maximum of two and 10% of the users with runs in the certain cluster.

Determining whether data is proprietary may utilize a profile of a user and/or a profile of an organization. For example, any data that appears in a profile of a user and/or an organization may be considered proprietary and thus not allowed to be included in a template. In another embodiment, the profile may indicate certain data is proprietary (e.g., by placing it a an exclusion list which prohibits utilization of the data in templates).

In one embodiment, testing whether certain data is proprietary is done by querying a database (e.g., a database that contains samples of proprietary data). Additionally or alternatively, the certain data may be submitted to a procedure that evaluates the data to determine whether the data is likely to be proprietary. For example, the procedure may perform semantic and/or syntactic analysis of the data to check whether the certain data has a certain meaning and/or contains certain patterns that indicate that it is likely to be proprietary. For example, the procedure may scan the certain data for strings like "bank account", "address", and/or "social security number".

In another embodiment, a user may provide feedback on certain data which indicates whether the certain data is proprietary. For example, the user may review values of data fields prior to running a test scenario and indicate which values the user considers proprietary. Additionally or alternatively, while a test scenario is running, the user may mark certain data as proprietary (e.g., data the user considers should not be seen by the user or other users). Optionally, the user may provide feedback the certain data via a user interface on which the user is running the test scenario.

In yet another embodiment, determining whether a certain value may be proprietary may be assisted by noting the source, location, and/or data structure that contains the certain value. For example, in certain systems, a value that appears in a checkbox on a screen is likely to be a default value of the system, and thus not likely to be proprietary. However, free text fields on screens are more likely to contain data entered by a user, and are thus likely to be proprietary. In a another example, in which the certain value appears in a drop-down menu in a screen, it might be necessary to determine from the context whether values in the drop-down menu are proprietary or not. Additionally, certain systems may be built in such a way that makes it relatively easy to determine which data is proprietary and which is not. For example, in SAP ERP meta data, which typically includes general (non-proprietary) data, is clearly marked.

In one embodiment, a value in a test scenario template that is considered proprietary is removed from the template. Optionally, the proprietary data is removed by a data cleaner module, a template generator module, a customization module, and/or another module and/or combination of modules. In one example, a value may be deleted from a template; consequently, the template may contain an indication of missing data (corresponding to the deleted value); prior to running a test scenario based on the template and/or during the run of the test scenario, the missing data needs to be provided (e.g., the user is prompted to provide it). Alternatively, a value in a test scenario template that is considered proprietary may be removed from the template by replacing it with a default or "dummy" value.

In one embodiment, proprietary data is not included in a template. For example, a module generating a template and/or a module customizing a template, check whether certain values are proprietary (e.g., by checking whether a certain flag related to the certain values is raised, or by submitting the certain values to a procedure for evaluation). If the certain values are deemed to be proprietary, they are not included in the template.

Proprietary data may be removed from runs of test scenarios at different stages. In one embodiment, the proprietary data is removed from runs of test scenarios as the runs are recorded and/or identified. For example, a "scrubbed" version of runs, which does not contain certain proprietary data, may be the data that is provided to components of the system (e.g., a clustering module and/or template generator). Optionally, determining what proprietary data is may relate to general statistics (e.g., utilization of certain elements and/or values by a certain proportion of organizations).

In another embodiment, proprietary data is removed from runs after clustering of the runs is performed. Optionally, determining what data in the runs should be considered proprietary utilizes the fact that after clustering, clusters contain similar runs. In one example, the fact that runs belong to clusters may enable the identification of certain values that are shared by many runs (which may indicate that the certain values are not proprietary), or shared by a few runs (which may indicate that the certain values are proprietary).

In some embodiments, test scenario templates are generated from one or more runs of test scenarios belonging to a certain cluster. Optionally, the templates are generated in such a way that they are not likely to include data that may be easily traced to specific runs in the certain cluster, users that ran runs belonging to the certain cluster, and/or organizations associated with runs belonging to the certain cluster. In these embodiments, generating a template may involve selecting a value from a run of a test scenario belonging to the certain cluster, checking whether the value appears in at least a first predetermined number of the runs in the certain cluster; checking whether the value appears in runs in the certain cluster that are associated with at least a second predetermined number of different organizations; and if both conditions are positive, enabling the test scenario template to utilize the selected value. Optionally, if at least one of the conditions is negative the test scenario template is not allowed to utilize the selected value.

In one embodiment, removing proprietary data from a test scenario template generated from one or more runs of test scenarios involves removing most output fields from the runs. Consequently, most of the information generated in the runs may be removed. In one example, most of the information output in the runs is considered proprietary, and is therefore removed. Optionally, as a result of removing most of the output fields, the test scenario template does not include expected values for most test steps. Optionally, running an instantiation of the test scenario template may require a user to provide values in most of the test steps.

Customizing a Test Scenario Template

Test scenario templates generated from runs of test scenarios of users belonging to different organizations may not be ideal for a certain user from a certain organization. For example, the templates may include information such as values that do not suite the certain user and/or the certain organization, and/or include certain test steps that are irrelevant for the certain user and/or the certain organization. It therefore may be beneficial to customize test scenario templates for a certain user and/or a certain organization. Optionally, customizing a test scenario template may be done as part of generating the template (e.g., by the template generator), by another module such as a customization module, or a combination of modules.

In some embodiments, customizing a test scenario template involves adding to the test scenario template one or more values that are relevant to a certain user and/or a certain organization. Optionally, the one or more values that are added replace existing values in the template that may be less appropriate for the certain user and/or the certain organization. Optionally, at least some of the values added to the template by the customizing replace proprietary data that has been removed from the template (e.g., by a data cleaner module).

In some embodiments, customizing a test scenario template is done using proprietary data related to a certain user and/or a certain organization. The proprietary data may be directly related to the certain user and/or the certain organization, such as internal organizational data of the certain user and/or the certain organization, and/or data obtained by monitoring the certain user and/or users belonging to the certain organization. Additionally or alternatively, the proprietary data may be of a different user and/or different organization, and based on similarity to the certain user and/or certain organization the proprietary data is assumed to be useful for customizing the template.

Proprietary data used to customize a test scenario template may have various sources. In one embodiment, proprietary data relevant to a certain user, for whom a test scenario template is customized, is obtained by providing the test scenario template to a different user, prompting the different user to provide a missing value, and recording an input value provided by the different user. Alternatively, the same process may be performed with the certain user, i.e., the test scenario template is provided to the certain user, the certain user is prompted to provide a value, and the value provided by the certain user.

In another embodiment, the proprietary data relevant to the certain user for whom the test scenario template is customized is obtained by guiding a user to provide the proprietary data while semiautomatically executing an instantiation of the test scenario template. Optionally, the user providing the proprietary data is the certain user. Providing proprietary data via semiautomatic execution may involve filling a value into a field missing a value in an instantiation of the test scenario template. This may be done by selecting a value from a database related to the certain user and testing whether the selected value is congruous with the field. If the selected value is congruous with the field, filling the field with the selected value. Otherwise, prompting the first user to provide a value for the field missing a value. Optionally, selecting the value utilizes a heuristics-based algorithm that is run on data from multiple organizations. For example, the selection of the value may be based in part on determining how often the value is used by other organizations. Additionally or alternatively, providing proprietary data via semiautomatic execution may involve filling a value into a field missing a value in an instantiation of the test scenario template by identifying users similar to the certain user. Following that, selecting a value from runs of test scenarios of the users similar to the certain user and then testing whether the selected value is congruous with the field. If the selected value is congruous with the field, the field may be filled with the selected value. Otherwise, the certain user may be prompted to provide a value for the field missing a value.

In one embodiment, proprietary data relevant to a certain user, for whom a test scenario template is customized, is obtained by marking locations of values that were removed from the test scenario template, and directing attention of a user to provide data appropriate for the marked locations. Optionally, the user is the certain user for whom the template is customized. Optionally, the values removed from the test scenario template were removed by a data cleaner module.

One source of proprietary data useful for customizing a test scenario template for a certain user may be a profile of the certain user. For example, such a profile may be provided to a module that performs customization of the template. Data in the profile, such as proprietary information related to the user and/or the organization may be inserted into the template. For example, a profile of the certain user may include the user's name, address, job title, and/or employee number; these values may be inserted in their appropriate positions in a customized template in order to save the certain user the time and effort of inserting them when running an instantiation of the template. In another example, the profile of the certain user may include a list of customers the user works with, parts the user frequently orders, and/or contact information of clients the user frequently interacts with. These values may be automatically inserted into a template in order to customize it and make it more relevant to the certain user.

In one embodiment, a profile of a user that is used to customize a test scenario template is a profile of a generic user of an organization. In this case, customizing the template may utilize information that does not identify a specific user. For example, to customize a template the system may use activity data from the profile such as a list of modules that are frequently run, but not use data such as an employee name of a real employee.

Another source of proprietary data useful for customizing a test scenario template for a certain user may be a data generator related to the certain user and/or a certain organization to which the certain user belongs. For example, the data generator may be a program that extracts values from a database related to the certain organization. The database may hold "real world" information such as actual customer orders, which can be used to generate tests that are more relevant.

In one embodiment, customizing a test scenario template for a first user utilizes a customization module and involves obtaining proprietary data relevant to the first user and substituting a non-empty subset of proprietary data removed from the template with the obtained data. Optionally, the obtained data undergoes processing prior to being entered into the template.

In one example, the proprietary data relevant to the first user is obtained from a previously monitored run of test scenario associated with the first user; for instance, the run of the test scenario may have been run by the first user, run by a user associated to an organization to which the first user belongs, and/or a user with a similar organizational role as the first user (e.g., both users are sales managers).

In another example, the proprietary data relevant to the first user is obtained from parsing a manual test scenario associated with the first user in order to obtain a value associated with the first user. For example, the manual test scenario may be a script for running a test that is intended to be used by the first user, a user associated to an organization to which the first user belongs, and/or a user with a similar organizational role as the first user. After obtaining the value associated with the first user, a non-empty subset of the removed proprietary data from the template is substituted with the obtained value.

In yet another example, the proprietary data relevant to the first user is obtained from analyzing a database of the software system associated with the first user to obtain a value associated with the first user. The database may include data on and/or be accessed by the first user, a user associated to an organization to which the first user belongs, and/or a user with a similar organizational role as the first user. After obtaining the value associated with the first user, a non-empty subset of the removed proprietary data from the template is substituted with the obtained value.

In one embodiment, the customization module is also configured to: provide the customized test scenario template to a second user, prompt the second user to provide a missing value, and record an input value provided by the second user. Optionally, the first user and the second user are the same user.

Values used for customization of templates may be obtained, in some embodiments, by exploiting wisdom of the crowd. This "wisdom" may be gained by analyzing runs of users from different organization in order to find certain patterns and common values. In one example, many organizations have a dummy customer entry for testing; for example, a customer named "test". Thus, entering "test" as a user is likely to allow a test scenario to run, so a customization module may try using the customer "test" in a template being customized. In another example, SAP catalog numbers usually start from 1000, and 1000 usually describes a catalog number for tests and not a real number. Thus, when customizing a template, if a catalog number is needed, the value 1000 may be tried. In both of these examples, the knowledge of which default values may be gained by examining runs of users from different organizations. This allows a customization module to discover from the crowd certain values that may not be apparent to whomever is customizing the template.

In embodiments described in this disclosure, after generating a test scenario template from one or more runs of test scenarios (e.g., using a template generator), the template might undergo further processing such as removal of proprietary data, customization, ranking, and/or the template may be suggested to the user. Optionally, the one or more runs of test scenarios belong to a certain cluster of similar runs of test scenarios. FIG. 9A to FIG. 9G illustrate some, but not all, combinations of system modules that may be used in embodiments described in this disclosure to process the template and/or suggest the template to a user.

Figure 9A:
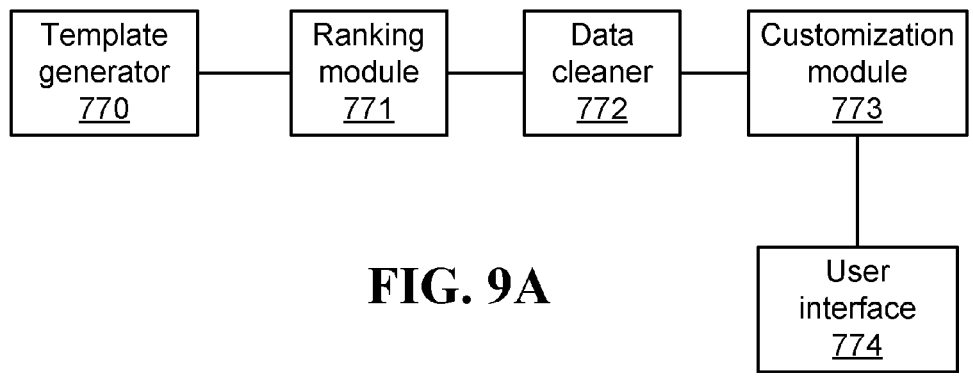
FIG. 9A illustrates a combination of system modules that may be used in embodiments described in this disclosure.

FIG. 9A illustrates a combination of system modules that may be used in embodiments in which a template generator 770 generates a test scenario template from one or more runs of test scenarios. The template is provided to a ranking module 771 that may rank the template, for example, by assigning it a score proportional to its relevancy to a certain user. Optionally, the ranking module 771 receives a profile of a certain user and/or a certain organization and utilizes data from the profile, in order to rank the template. Following that, a data cleaner 772 receives the template and may remove proprietary data from the template. Optionally, the data cleaner 772 receives a profile related to a certain user and/or a certain organization, and utilizes the profile to remove certain proprietary data from the template. After removing proprietary data from the template, the template from which proprietary was removed is provided to a customization module 773 that customizes the template by adding certain data to the template. Optionally, the customization module 773 receives a profile of a certain user and/or a certain organization and adds data from the profile, which relevant to the certain user and/or organization, to the template. The customized template from which proprietary data was removed is then provided to a user interface 774. Optionally, the user interface 774 presents to a user a suggestion to run an instantiation of the customized template from which proprietary data was first removed.

It is to be noted that in this disclosure, though modules may be illustrated in figures as separate elements, in some embodiments, they may be implemented as a single element that performs the functionality of modules. For example, the software module that implements the template generator 770 may also perform the tasks of the data cleaner 772. In another example, the customization module 773 and the data cleaner 772 are realized by the same software programs.

Figure 9B:
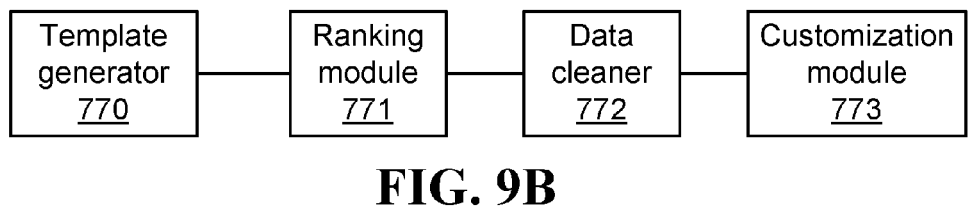
FIG. 9B illustrates a combination of system modules that may be used in embodiments described in this disclosure.

In other embodiments, after being processed by various modules, a template generated by the template generator need not be provided to a user interface. For example, it may be stored in the system for further use. FIG. 9B illustrates a similar portion of a system to the system illustrated in FIG. 9A, however in this system after being subjected to ranking, removal of proprietary data, and customization, a template is not presented to a user via a user interface.

Figure 9C:
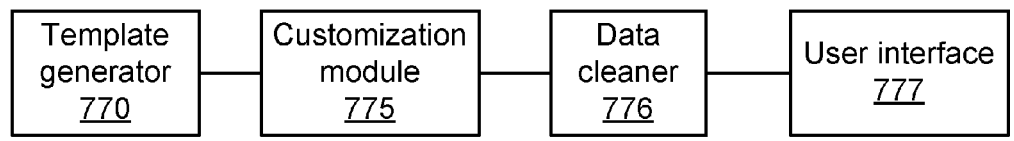
FIG. 9C illustrates a combination of system modules that may be used in embodiments described in this disclosure.
Figure 9D:
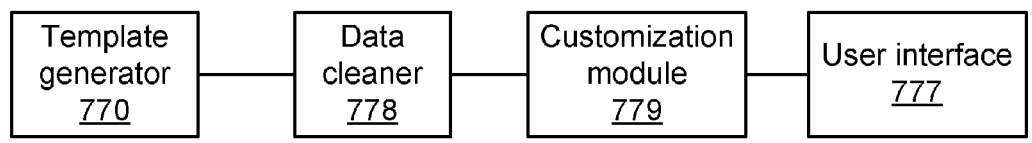
FIG. 9D illustrates a combination of system modules that may be used in embodiments described in this disclosure.

The order in which a template may undergo processing by system modules may differ between embodiments. For example, FIG. 9C illustrates a combination of system modules which includes the template generator 770 which provides a template for customization by a customization module 775. Following the customization, a data cleaner 776 removes proprietary data from the template. The template is then provided to a user interface 777, for example, in order to be suggested to a user. FIG. 9D illustrates a similar system, however in it a template generated by the template generator 770 is first provided to a data cleaner 778. After removing proprietary data from the template, the template is provided to a customization module 779. The customized template may then be presented to a user via the user interface 777.

Figure 9E:
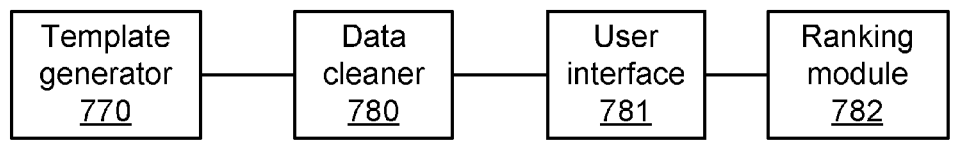
FIG. 9E illustrates a combination of system modules that may be used in embodiments described in this disclosure.
Figure 9F:
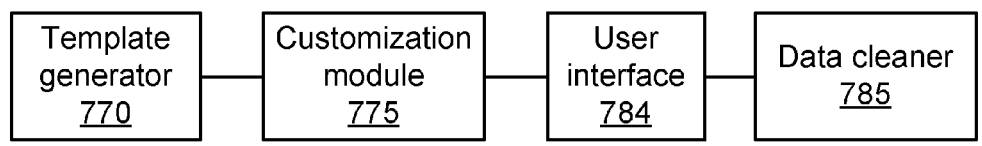
FIG. 9F illustrates a combination of system modules that may be used in embodiments described in this disclosure.

In some embodiments, a user interface is not necessarily used to suggest templates to a user; it may be utilized by other system modules to perform their task. FIG. 9E illustrates a combination of system modules that may be utilized in embodiments, in which a ranking module 782 and a data cleaner 780 interact with a user interface 781. For example, the data cleaner 780 may present a template generated by the template generator 770 to a user on the user interface 781, in order for the user to mark and/or approve certain proprietary data the data cleaner found in the template. Additionally, the ranking module 782 may present a ranking of the template in order for the user to verify the ranking and/or edit it. Optionally, the user may then determine what is to be done with the template (e.g., should the user run it, save it for later, and/or discard it). FIG. 9F illustrates a combination of system modules that may be utilized in embodiments, in which a customization module 775 utilizes a user interface to perform customization of a template. For example, data that was added to a template generated by the template generator 770 is presented to a user on a user interface 784 for approval and/or editing. Following that, the template may be subjected to removal of proprietary data by a data cleaner 785. For example, the proprietary data may be added by the user via the user interface 784.

Figure 9G:
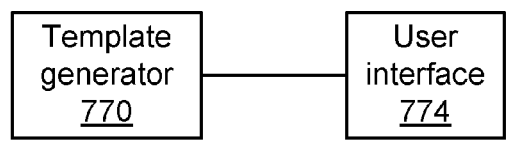
FIG. 9G illustrates a combination of system modules that may be used in embodiments described in this disclosure.

In some embodiments, a template that is generated by a template generator does not undergo additional processing by system modules. For example, as illustrated in FIG. 9G, after being generated by the template generator 770, the template may be sent to the user interface 774 (e.g., to be suggested to a user).

While some of the above embodiments may be described in the general context of program components that execute in conjunction with an application program that runs on an operating system on a computer, which may be a personal computer, those skilled in the art will recognize that aspects may also be implemented in combination with other program components. Program components may include routines, programs, modules, data structures, and other types of structures that perform particular tasks or implement particular abstract data types. Moreover, the embodiments may be practiced with other computer system configurations, such as: cloud computing, a client-server model, grid computing, peer-to-peer, hand-held devices, multiprocessor systems, microprocessor-based systems, programmable consumer electronics, minicomputers, and/or mainframe computers. The embodiments may also be practiced in a distributed computing environment where tasks are performed by remote processing devices that are linked through a communication network. In a distributed computing environment, program components may be located in both local and remote computing and/or storage devices. Some of the embodiments may also be practiced in the form of a service, such as infrastructure as a service (IaaS), platform as a service (PaaS), software as a service (SaaS), and/or network as a service (NaaS).

Embodiments may be implemented as a computer implemented method, a computer system, and/or as a non-transitory computer-readable medium. The non-transitory computer-readable medium comprises program code which provides, or participates in providing, instructions to a processor. The non-transitory computer-readable medium may be implemented, for example, via one or more of a volatile computer memory, a non-volatile memory, a hard drive, a flash drive, a magnetic data storage, an optical data storage, and/or any other type of a tangible computer memory to be invented that is not transitory signals per se. The program code may be updated and/or downloaded to the non-transitory computer-readable medium via a communication network such as the Internet.

Herein, a predetermined value, such as a predetermined threshold, may be a fixed value and/or a value determined any time before performing a calculation that compares a certain value with the predetermined value. A value may also be considered to be a predetermined value when the logic, used to determine whether a threshold that utilizes the value is reached, is known before start of performing computations to determine whether the threshold is reached.

In this description, references to "one embodiment" mean that the feature being referred to may be included in at least one embodiment of the invention. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and therefore may not necessarily correspond to discrete hardware elements.

While the methods disclosed herein have been described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

What is claimed is:

1. A computer system configured to utilize divergent routes identified in runs of test scenarios to manipulate a test scenario template, comprising:
   a test identifier configured to identify runs of test scenarios run by users belonging to different organizations on software systems associated with the different organizations; wherein each organization of the different organizations has a different composition of shareholders;
   a route analyzer configured to receive a certain run of a test scenario run on a software system associated with a certain organization that does not belong to the different organizations;
   wherein the certain run of a test scenario is instantiated from a test scenario template and the test scenario template defines a template route that instantiations of the test scenario template are supposed to follow;
   the route analyzer is further configured to identify that the certain run follows a certain divergent route that diverges from the template route in at least one of the following ways: the certain divergent route diverges from the template route and later on converges back to the template route the certain divergent route diverges from the template route and does not converge back to the template route and the certain divergent route merges with the template route;
   a database configured to store the certain divergent route;
   a route counter configured to determine that number of divergent routes in the database that are essentially the same as the certain divergent route reaches a predetermined threshold greater than one; and
   a template manipulator configured to manipulate the test scenario template according to the divergent routes in the database that are essentially the same as the certain divergent route.

2. The computer system of claim 1, wherein the template manipulator further configured to manipulate the test scenario template by updating the test scenario template according to one or more of the divergent routes.

3. The computer system of claim 1, wherein the template manipulator further configured to manipulate the test scenario template by generating a new test scenario template based on the test scenario template and one or more of the divergent routes.

4. The computer system of claim 1, wherein a route defines a sequence of one or more elements involved in running a test scenario; wherein an element is selected from the group consisting of test steps, transactions, and screens.

5. The computer system of claim 4, wherein a divergent route that diverges from a template route is characterized by a different sequence of elements compared to sequence of elements defined by the template route.

6. The computer system of claim 4, wherein divergent routes that are essentially the same include routes that are characterized by at least one of: a same sequence of screens, a same sequence of screens but with different user keys, and a same sequence of screens which utilize different default values for at least some fields displayed on the screens.

7. The computer system of claim 1, wherein the template manipulator is further configured determine that the number does not reach the predetermined threshold, and not to manipulate the test scenario template according to the divergent routes; and wherein the predetermined threshold is selected such that reaching the predetermined threshold indicates that the divergent routes are also likely to be useful for other organizations.

8. The computer system of claim 1, further comprising a data cleaner configured to select a value from the manipulated test scenario template, determine the selected value does not appear in runs of test scenarios that follow at least two divergent routes in the database that are essentially the same as the certain divergent route, and remove the selected value from the manipulated test scenario template.

9. The computer system of claim 1, wherein the predetermined threshold is at least three registered divergent routes belonging to three different organizations.

10. The computer system of claim 1, further comprising a ranking module configured to rank the manipulated test scenario template according to the number of the divergent routes.

11. The computer system of claim 1, further comprising a ranking module configured to rank the manipulated test scenario template according to number of different organizations associated with the divergent routes.

12. A computer implemented method for utilizing divergent routes identified in runs of test scenarios to manipulate a test scenario template, comprising:
   identifying runs of test scenarios run by users belonging to different organizations on software systems associated with the different organizations; wherein each organization of the different organizations has a different composition of shareholders;
   receiving a certain run of a test scenario run on a software system associated with a certain organization that does not belong to the different organizations; wherein the certain run is instantiated from a test scenario template and the test scenario template defines a template route that instantiations of the test scenario template are supposed to follow;
   identifying that the certain run follows a certain divergent route that diverges from the template route in at least one of the following ways: the certain divergent route diverges from the template route and later on converges back to the template route, the certain divergent route diverges from the template route and does not converge back to the template route, and the certain divergent route merges with the template route;
   storing the certain divergent route in a database;
   identifying that number of divergent routes in the database, which are essentially the same as the certain divergent route, reaches a predetermined threshold greater than one; and
   manipulating the test scenario template according to the divergent routes in the database that are essentially the same as the certain divergent route.

13. A non-transitory computer-readable medium for use in a computer to utilize divergent routes identified in runs of test scenarios to manipulate a test scenario template; the computer comprises a processor, and the non-transitory computer-readable medium comprising:

program code for identifying runs of test scenarios run by users belonging to different organizations on software systems associated with the different organizations; wherein each organization of the different organizations has a different composition of shareholders;

program code for receiving a certain run of a test scenario run on a software system associated with a certain organization that does not belong to the different organizations; wherein the certain run is instantiated from a test scenario template and the test scenario template defines a template route that instantiations of the test scenario template are supposed to follow;

program code for identifying that the certain run follows a certain divergent route that diverges from the template route in at least one of the following ways: the certain divergent route diverges from the template route and later on converges back to the template route, the certain divergent route diverges from the template route and does not converge back to the template route, and the certain divergent route merges with the template route;

program code for storing the certain divergent route in a database;

program code for identifying that number of divergent routes in the database, which are essentially the same as the certain divergent route, reaches a predetermined threshold greater than one; and program code for manipulating the test scenario template according to the divergent routes in the database that are essentially the same as the certain divergent route.

14. The non-transitory computer-readable medium of claim 13, further comprising program code for determining that the number does not reach the predetermined threshold, and refraining from manipulating the test scenario template according to the divergent routes.

15. The computer implemented method of claim 12, further comprising manipulating the test scenario template by updating the test scenario template according to one or more of the divergent routes.

16. The computer implemented method of claim 12, further comprising manipulating the test scenario template by generating a new test scenario template based on the test scenario template and one or more of the divergent routes.

17. The computer implemented method of claim 12, further comprising selecting a value from the manipulated test scenario template, determining the selected value does not appear in runs of test scenarios that follow at least two divergent routes in the database that are essentially the same as the certain divergent route, and removing the selected value from the manipulated test scenario template.

18. The non-transitory computer-readable medium of claim 13, further comprising program code for manipulating the test scenario template by updating the test scenario template according to one or more of the divergent routes.

19. The non-transitory computer-readable medium of claim 13, further comprising program code for manipulating the test scenario template by generating a new test scenario template based on the test scenario template and one or more of the divergent routes.

20. The non-transitory computer-readable medium of claim 13, further comprising program code for: selecting a value from the manipulated test scenario template, determining the selected value does not appear in runs of test scenarios that follow at least two divergent routes in the database that are essentially the same as the certain divergent route, and removing the selected value from the manipulated test scenario template.

* * * * *